US012315310B1

(12) United States Patent
Arezza et al.

(10) Patent No.: US 12,315,310 B1
(45) Date of Patent: May 27, 2025

(54) SYSTEMS FOR DETERMINING FUEL LEVEL

(71) Applicant: Geotab Inc., Oakville (CA)

(72) Inventors: Giordano Aldo Arezza, Maple (CA); Giuliano Roberto Barrella Garcia, Toronto (CA); Gagandeep Bedi, Cambridge (CA); Young Seok Shin, Kitchener (CA); Nadia Sophia Stefopulos, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/815,371

(22) Filed: Aug. 26, 2024

Related U.S. Application Data

(60) Provisional application No. 63/598,755, filed on Nov. 14, 2023.

(51) Int. Cl.
*G07C 5/04* (2006.01)
*G07C 5/00* (2006.01)

(52) U.S. Cl.
CPC ............... *G07C 5/04* (2013.01); *G07C 5/008* (2013.01)

(58) Field of Classification Search
CPC .................................. G07C 5/04; G07C 5/008
USPC ........................................................ 701/32.1
See application file for complete search history.

(56) References Cited

U.S. PATENT DOCUMENTS

| | | | | |
|---|---|---|---|---|
| 6,092,021 | A * | 7/2000 | Ehlbeck | G01L 3/26 701/123 |
| 10,040,459 | B1 | 8/2018 | Kukreja | |
| 10,823,125 | B1 * | 11/2020 | Kilaru | B60K 15/03 |
| 11,971,268 | B2 * | 4/2024 | Fotak | G06Q 10/06 |
| 2018/0012204 | A1 * | 1/2018 | Shetty | G06Q 20/20 |
| 2018/0087948 | A1 * | 3/2018 | Khandelwal | B60K 15/03 |
| 2020/0074372 | A1 * | 3/2020 | Whaling | G06Q 30/0206 |
| 2021/0155221 | A1 * | 5/2021 | Gottehrer | B60W 20/40 |
| 2022/0126856 | A1 * | 4/2022 | Palmer | B60W 40/10 |

* cited by examiner

*Primary Examiner* — Tyler D Paige
(74) *Attorney, Agent, or Firm* — Mark J. Pringle-Rigby

(57) ABSTRACT

Systems, methods, devices, and models determining fuel level in vehicles are described. Raw fuel sensor data tends to be noisy and of low quality. Herein, operational data is collected, which is used to determine times when motion of the vehicle is stable. Raw fuel sensor data for these times is collected in a data subset, which is used to determine fuel level. Quality fuel sensor data is thus obtained. Fuel data can be combined over different time periods to provide a prompt initial fuel level, and an intermittent fuel level during a trip.

20 Claims, 13 Drawing Sheets

1110 1120 1130 1140

| Vehicle | Fuel Level | Next Trip | Sufficient? |
|---|---|---|---|
| XXX-XXX | 65% | 12 km | Yes |
| YYY-YYY | 10% | 87 km | **NO** |
| ZZZ-ZZZ | 100% | 35 km | Yes |
| ... | ... | ... | ... |

1100

1300

| Vehicle (1310) | Departure Fuel Level (1320) | Return Fuel Level (1330) | Difference? (1340) |
|---|---|---|---|
| AAA-AAA | 65% | 65% | 0 |

1350 Vehicle AAA-AAA has been refilled.

Figure 13

1400

| Vehicle (1410) | Departure Fuel Level (1420) | Return Fuel Level (1430) | Difference? (1440) |
|---|---|---|---|
| BBB-BBB | 80% | 30% | 30 Liters |

1450 Vehicle BBB-BBB has NOT been refilled.

Figure 14

1500

| Vehicle (1510) | Departure Fuel Level (1520) | Return Fuel Level (1530) | Difference? (1540) |
|---|---|---|---|
| CCC-CCC | 75% | 74% | 0.6 Liters |

1550 Vehicle CCC-CCC has been refilled.

Figure 15

SYSTEMS FOR DETERMINING FUEL LEVEL

PRIOR APPLICATION DATA

This application claims priority to U.S. Provisional Patent Application No. 63/598,755, filed on Nov. 14, 2023, titled "Systems, Devices, and Methods for Determining Vehicle Fuel Level".

TECHNICAL FIELD

The present disclosure generally relates to systems, devices, methods, and models for determining fuel level in vehicles, and in particular relates to determining fuel level based on non-ideal data.

BACKGROUND

Many types of vehicles consume fuel in order to operate. Such fuels include fossil fuels and derivatives thereof (e.g. gasoline, diesel etc.), but can also include alternative fuels such as biodiesel, ethanol, etc. Such fuel is carried by a tank attached to or integrated with a vehicle, and is consumed as the vehicle is utilized. It is desirable to know how much fuel is in a tank of a vehicle, to enable effective management of the vehicle.

SUMMARY

According to a broad aspect, the present disclosure describes a method comprising: collecting, by at least one data collection device positioned at a vehicle, operation data representing kinetic operation of the vehicle; collecting, by the at least one data collection device, raw fuel level data indicative of a fuel level in a fuel tank of the vehicle; identifying raw fuel level data points for inclusion in a fuel level data subset, by: identifying, by at least one processor over a moving time window, whether the operation data is within stability criteria; for time periods where the operation data is within the stability criteria within the moving time window, include data points of the raw fuel level data in the fuel level data subset; and for time periods where the operation data is outside of the stability criteria within the moving time window, exclude data points of the raw fuel level data from the fuel level data subset; determining, by the at least one processor, a fuel level trend based on the fuel level data subset; outputting at least a portion of the fuel level trend to another device.

The operation data may comprise movement speed data representing a movement speed of the vehicle; and the stability criteria may comprise a threshold in movement speed of the vehicle over time. The stability criteria may comprise a median speed of zero over the moving time window.

The operation data may comprise vehicle engine data representing a rotation speed of an engine of the vehicle; and the stability criteria may comprise a threshold in rotation speed of the engine of the vehicle over time. The stability criteria may comprise a co-efficient of variation of the rotation speed of the engine of the vehicle.

The operation data may comprise acceleration data representing acceleration of the vehicle; and the stability criteria may comprise a threshold magnitude of acceleration of the vehicle.

The operation data may comprise: movement speed data representing a movement speed of the vehicle, and vehicle engine data representing a rotation speed of an engine of the vehicle; the stability criteria may comprise a threshold in movement speed of the vehicle over time and a threshold in rotation speed of the engine of the vehicle over time; and identifying whether the operation data is within the stability criteria may comprise identifying whether the operation data are within either of the threshold in movement speed of the vehicle or the threshold in rotation speed of the engine of the vehicle.

Determining the fuel level trend based on the fuel level data subset may comprise determining an average fuel level by averaging data points in the fuel level data subset. Determining the fuel level trend based on the fuel level data subset may comprise determining a best fit trend to the fuel level data subset.

The fuel level data subset may be constrained to a set number of data points; and in order to include new data points of the raw fuel level data in the fuel level data subset, data points in the fuel level data subset which are oldest are removed from the fuel level data subset.

The fuel level data subset may be reset in response to an ignition of the vehicle being turned off.

Outputting at least a portion of the fuel level trend to another device may comprise transmitting, by a communication interface positioned at the vehicle, the at least a portion of the fuel level trend to a server remote from the vehicle.

The method may further comprise generating a simplified fuel level dataset by selectively filtering data points of the fuel level trend; and outputting at least a portion of the fuel level trend to another device may comprise outputting the simplified fuel level dataset to the another device. Generating a simplified fuel level dataset by selectively filtering data points of the fuel level trend may comprise: identifying select data points from the fuel level trend for inclusion in the simplified fuel level dataset, based on differences between the select data points and iteratively-defined reference lines through portions of the fuel level trend; and compiling the select data points as the simplified fuel level dataset, excluding data points which are not identified as select data points.

The method may further comprise presenting, by a user interface of the another device, a fuel level of the vehicle as represented by the at least a portion of the fuel level trend.

The method may further comprise presenting, by a user interface of the another device, a notification when a fuel level of the vehicle as represented by the at least a portion of the fuel level trend falls below a fuel threshold.

The method may further comprise presenting, by a user interface of the another device, an indication of a fuel level of the vehicle as represented by the at least a portion of the fuel level trend, as compared to a fuel level of the vehicle as stored for a previous time.

The method may further comprise presenting, by a user interface of the another device, a notification when a fuel level of the vehicle as represented by the at least a portion of the fuel level trend changes at a rate which exceeds a change rate threshold.

According to another broad aspect, the present disclosure describes a system comprising: at least one data collection device positioned at a vehicle; at least one communication interface; at least one processor positioned at the vehicle; and at least one non-transitory processor-readable storage medium positioned at the vehicle, the at least one non-transitory processor-readable storage medium storing processor-executable instructions which, when executed by the at least one processor cause the system to: collect, by the at least one data collection device, operation data representing kinetic operation of the vehicle; collect, by the at least one data collection device, raw fuel level data indicative of a fuel level in a fuel tank of the vehicle; identify, by the at least one processor, raw fuel level data points for inclusion in a fuel level data subset, by: identify, by the at least one processor over a moving time window, whether the operation data is within stability criteria; for time periods where the operation data is within the stability criteria within the moving time window, include data points of the raw fuel level data in the fuel level data subset; and for time periods where the operation data is outside of the stability criteria within the moving time window, exclude data points of the raw fuel level data from the fuel level data subset; determine, by the at least one processor, a fuel level trend based on the fuel level data subset; output, by the at least one communication interface, at least a portion of the fuel level trend to another device.

The operation data may comprise movement speed data representing a movement speed of the vehicle; and the stability criteria may comprise a threshold in movement speed of the vehicle over time. The stability criteria may comprise a median speed of zero over the moving time window.

The operation data may comprise vehicle engine data representing a rotation speed of an engine of the vehicle; and the stability criteria may comprise a threshold in rotation speed of the engine of the vehicle over time. The stability criteria may comprise a co-efficient of variation of the rotation speed of the engine of the vehicle.

The operation data may comprise acceleration data representing acceleration of the vehicle; and the stability criteria may comprise a threshold magnitude of acceleration of the vehicle.

The operation data may comprise: movement speed data representing a movement speed of the vehicle, and vehicle engine data representing a rotation speed of an engine of the vehicle; the stability criteria may comprise a threshold in movement speed of the vehicle over time and a threshold in rotation speed of the engine of the vehicle over time; and the processor-executable instructions which cause the system to identify whether the operation data is within the stability criteria may cause the at least one processor to identify whether the operation data is within either of the threshold in movement speed of the vehicle or the threshold in rotation speed of the engine of the vehicle.

The at least one data collection device may include at least one sensor selected from a group of sensors consisting of: a fuel level sensor; a location sensor; a speed sensor; an engine rotation speed sensor; a wheel rotation speed sensor; an accelerometer; and an inertial measurement unit.

The processor-executable instructions which cause the at least one processor to determine the fuel level trend based on the fuel level data subset may cause the at least one processor to determine an average fuel level by averaging data points in the fuel level data subset.

The processor executable instructions which cause the at least one processor to determine the fuel level trend based on the fuel level data subset may cause the at least one processor to determine a best fit trend to the fuel level data subset.

The fuel level data subset may be constrained to a set number of data points; and in order to include new data points of the raw fuel level data in the fuel level data subset, data points in the fuel level data subset which are oldest are removed from the fuel level data subset.

The fuel level data subset may be reset in response to an ignition of the vehicle being turned off.

The processor-executable instructions which cause the system to output at least a portion of the fuel level trend to another device may cause the communication interface to transmit the at least a portion of the fuel level trend to a server remote from the vehicle.

The processor-executable instructions may further cause the at least one processor to generate a simplified fuel level dataset by selectively filtering data points of the fuel level trend; and the processor executable instructions which cause the system to output at least a portion of the fuel level trend to another device may cause the communication interface to output the simplified fuel level dataset to the another device. The processor executable instructions which cause the at least one processor to generate a simplified fuel level dataset by selectively filtering data points of the fuel level trend may cause the at least one processor to: identify select data points from the fuel level trend for inclusion in the simplified fuel level dataset, based on differences between the select data points and iteratively-defined reference lines through portions of the fuel level trend; and compile the select data points as the simplified fuel level dataset, excluding data points which are not identified as select data points.

The system may further comprise: the another device; and a user interface associated with the another device. The system may further comprise further processor executable instructions at the another device, when executed by another processor at the another device, cause the user interface to present, to a user, a fuel level of the vehicle as represented by the at least a portion of the fuel level trend. The system may further comprise further processor executable instructions at the another device, when executed by another processor at the another device, cause the user interface to present, to a user, a notification when a fuel level of the vehicle as represented by the at least a portion of the fuel level trend falls below a fuel threshold. The system may further comprise further processor executable instructions at the another device, when executed by another processor at the another device, cause the user interface to present, to a user, an indication of a fuel level of the vehicle as represented by the at least a portion of the fuel level trend, as compared to a fuel level of the vehicle as stored for a previous time. The system may further comprise further processor executable instructions at the another device, when executed by another processor at the another device, cause the user interface to present, to a user, a notification when a fuel level of the vehicle as represented by the at least a portion of the fuel level trend changes at a rate which exceeds a change rate threshold.

According to yet another broad aspect, the present disclosure describes a method comprising: collecting, by at least one data collection device positioned at a vehicle, operation data representing kinetic operation of the vehicle; collecting, by the at least one data collection device, raw fuel level data indicative of a fuel level in a fuel tank of the vehicle; for a first time period following activation of the vehicle: combining, by at least one processor of the at least one data collection device, the raw fuel level data corresponding to the first time period to determine a first fuel level data point for the first time period representing an initial fuel level of the vehicle; and after the first time period, determining, by the at least one processor, a plurality of second fuel level data points for a plurality of second time periods, each second fuel level data point corresponding to a respective second time period of the plurality of second time periods, comprising for each second time period of the plurality of second time periods: identifying, for each data point of operation data in the second time period, whether the data point is within stability criteria; for each data point of operation data in the second time period which is within the stability criteria, including a corresponding data point of the raw fuel level data in a fuel level data subset; for each data point of operation data in the second time period which is outside the stability criteria, excluding a corresponding data point of the raw fuel level data from the fuel level data subset; and combining, by the at least one processor, the fuel level data in the fuel level data subset to determine a respective second fuel level data point for the second time period; transmitting, by the at least one communication interface of the at least one data collection device, the first data point for the first time period and at least one data point of the plurality of second fuel level data points for the plurality of second time periods.

The operation data may comprise movement speed data representing a movement speed of the vehicle; and the stability criteria may comprise a threshold in movement speed of the vehicle.

The operation data may comprise vehicle engine data representing a rotation speed of an engine of the vehicle; and the stability criteria may comprise a threshold in rotation speed of the engine of the vehicle. The stability criteria may comprise a co-efficient of variation of the rotation speed of the engine of the vehicle.

The operation data may comprise acceleration data representing acceleration of the vehicle; and the stability criteria may comprise a threshold magnitude of acceleration of the vehicle.

The operation data may comprise: movement speed data representing a movement speed of the vehicle, and acceleration data representing acceleration of the vehicle; the stability criteria may comprise a threshold in movement speed of the vehicle and a threshold magnitude of acceleration of the vehicle; and identifying whether each point of operation data is within the stability criteria may comprise identifying whether each point of operation data is within the threshold in movement speed of the vehicle and the threshold magnitude of acceleration of the vehicle.

The operation data may comprise: movement speed data representing a movement speed of the vehicle, and vehicle engine data representing a rotation speed of an engine of the vehicle; the stability criteria may comprise a threshold in movement speed of the vehicle and a threshold in rotation speed of the engine of the vehicle; and identifying whether each point of operation data is within the stability criteria may comprise identifying whether each point of operation data is within either of the threshold in movement speed of the vehicle or the threshold in rotation speed of the engine of the vehicle.

Combining the raw fuel level data corresponding to the first time period may comprise determining an average fuel level for the first time period by averaging data points in the raw fuel level data for the first time period.

Combining the fuel level data in the fuel level data subset may comprise determining an average fuel level for the respective second time period by averaging data points in the fuel level data subset for the respective second time period.

The method may further comprise receiving, by at least one communication interface of a server remote from the vehicle, the first fuel level data point for the first time period and the at least one data point of the respective second fuel level data points for the plurality of second time periods.

The method may further comprise generating a simplified fuel level dataset for the plurality of second time periods by selectively filtering the plurality of second fuel level data points for the plurality of second time periods; and transmitting at least one data point of the plurality of second fuel level data points for the plurality of second time periods may comprise transmitting the simplified fuel level dataset for the plurality of second time periods. Generating the simplified fuel level dataset for the plurality of second time periods by selectively filtering the plurality of second fuel level data points for the plurality of second time periods may comprise: identifying select data points from the plurality of second fuel level data points for inclusion in the simplified fuel level dataset, based on differences between the select data points and iteratively-defined reference lines through portions of the fuel level trend; and compiling the select data points as the simplified fuel level dataset, excluding data points which are not identified as select data points.

The method may further comprise receiving, by at least one communication interface of another device remote from the vehicle, the first fuel level data point for the first time period and the at least one data point of the plurality of second fuel level data points for the plurality of second time periods. The method may further comprise presenting, by a user interface of the other device, fuel level information for the vehicle as represented by the first fuel level data point for the first time period or the at least one data point of the plurality of second fuel level data points for the plurality of second time periods. The method may further comprise presenting, by a user interface of the another device, a notification when a fuel level of the vehicle falls below a fuel threshold, based on the at least one data point of the plurality of second fuel level data points for the plurality of second time periods. The method may further comprise presenting, by a user interface of the other device, an indication of a fuel level of the vehicle as represented by the at least one data point of the plurality of second fuel level data points for the plurality of second time periods, as compared to a fuel level of the vehicle as stored for a previous time which precedes the first time period.

The method may further comprise: determining, by at least one processor of the other device, a rate of change of a fuel level of the vehicle over time, based on the at least one data point of the respective second fuel level data points for the plurality of second time periods; and presenting, by a user interface of the other device, a notification when the rate of change of the fuel level exceeds a change rate threshold. Determining the rate of change of a fuel level of the vehicle over time may be further based on the first fuel level data point for the first time period. Determining the rate of change of a fuel level of the vehicle over time may be further based on a fuel level of the vehicle as stored for a previous time which precedes the first time period.

According to yet another broad aspect, the present disclosure describes a system comprising: at least one data collection device positioned at a vehicle; at least one first communication interface; at least one processor positioned at the vehicle; and at least one non-transitory processor-readable storage medium positioned at the vehicle, the at least one non-transitory processor-readable storage medium storing processor-executable instructions which, when executed by the at least one processor cause the system to: collect, by the at least one data collection device, operation data representing kinetic operation of the vehicle; collect, by the at least one data collection device, raw fuel level data indicative of a fuel level in a fuel tank of the vehicle; for a first time period following activation of the vehicle: combine, by the at least one processor of the at least one data collection device, the raw fuel level data corresponding to the first time period to determine a first fuel level data point for the first time period representing an initial fuel level of the vehicle; and after the first time period, determine, by the at least one processor, a plurality of second fuel level data points for a plurality of second time periods, each second fuel level data point corresponding to a respective second time period of the plurality of second time periods, comprising for each second time period of the plurality of second time periods: identifying, for each data point of operation data in the second time period, whether the data point is within stability criteria; for each data point of operation data in the second time period which is within the stability criteria, including a corresponding data point of the raw fuel level data in a fuel level data subset; for each data point of operation data in the second time period which is outside the stability criteria, excluding a corresponding data point of the raw fuel level data from the fuel level data subset; and combining, by the at least one processor, the fuel level data in the fuel level data subset to determine a respective second fuel level data point for the second time period; transmit, by the at least one first communication interface, the first data point for the first time period and at least one data point of the plurality of second fuel level data points for the plurality of second time periods.

The operation data may comprise movement speed data representing a movement speed of the vehicle; and the stability criteria may comprise a threshold in movement speed of the vehicle.

The operation data may comprise vehicle engine data representing a rotation speed of an engine of the vehicle; and the stability criteria may comprise a threshold in rotation speed of the engine of the vehicle. The stability criteria may comprise a co-efficient of variation of the rotation speed of the engine of the vehicle.

The operation data may comprise acceleration data representing acceleration of the vehicle; and the stability criteria may comprise a threshold magnitude of acceleration of the vehicle.

The operation data may comprise: movement speed data representing a movement speed of the vehicle, and acceleration data representing acceleration of the vehicle; the stability criteria may comprise a threshold in movement speed of the vehicle and a threshold magnitude of acceleration of the vehicle; and the processor executable instructions which cause the at least one processor to identify whether each point of operation data is within the stability criteria may cause the at least one processor to identify whether each point of operation data is within the threshold in movement speed of the vehicle and the threshold magnitude of acceleration of the vehicle.

The operation data may comprise: movement speed data representing a movement speed of the vehicle, and vehicle engine data representing a rotation speed of an engine of the vehicle; the stability criteria may comprise a threshold in movement speed of the vehicle and a threshold in rotation speed of the engine of the vehicle; and the processor-executable instruction which cause the at least one processor to identify whether each point of operation data is within the stability criteria may cause the at least one processor to identify whether each point of operation data is within either of the threshold in movement speed of the vehicle or the threshold in rotation speed of the engine of the vehicle.

The processor-executable instructions which cause the at least one processor to combine the raw fuel level data corresponding to the first time period may cause the at least one processor to determine an average fuel level for the first time period by averaging data points in the raw fuel level data for the first time period.

The processor-executable instructions which cause the at least one processor to combine the fuel level data in the fuel level data subset may cause the at least one processor to determine an average fuel level for the respective second time period by averaging data points in the fuel level data subset for the respective second time period.

The system may further comprise a server remote from the vehicle including at least one second communication interface, and the processor-executable instructions may further cause the at least one second communication interface to receive the first fuel level data point for the first time period and the at least one data point of the respective second fuel level data points for the plurality of second time periods.

The processor-executable instructions may further cause the at least one processor to generate a simplified fuel level dataset for the plurality of second time periods by selectively filtering the plurality of second fuel level data points for the plurality of second time periods; and the processor-executable instructions which cause the at least one first communication interface to transmit at least one data point of the plurality of second fuel level data points for the plurality of second time periods may cause the at least one first communication interface to transmit the simplified fuel level dataset for the plurality of second time periods. The processor-executable instructions which cause the at least one processor to generate the simplified fuel level dataset for the plurality of second time periods by selectively filtering the plurality of second fuel level data points for the plurality of second time periods may cause the at least one processor to: identify select data points from the plurality of second fuel level data points for inclusion in the simplified fuel level dataset, based on differences between the select data points and iteratively-defined reference lines through portions of the fuel level trend; and compile the select data points as the simplified fuel level dataset, excluding data points which are not identified as select data points.

The system may further comprise at least one second communication interface of another device remote from the vehicle, and the processor-executable instructions may further cause the at least one second communication interface to receive the first fuel level data point for the first time period and the at least one data point of the plurality of second fuel level data points for the plurality of second time periods. The system may further comprise a user interface at the other device remote from the vehicle, and the processor-executable instructions may further cause the user interface to present fuel level information for the vehicle as represented by the first fuel level data point for the first time period or the at least one data point of the plurality of second fuel level data points for the plurality of second time periods. The system may further comprise a user interface at the other device remote from the vehicle, and the processor-executable instructions may further cause the user interface to present a notification when a fuel level of the vehicle falls below a fuel threshold, based on the at least one data point of the plurality of second fuel level data points for the plurality of second time periods. The system may further comprise a user interface at the other device remote from the vehicle, and the processor-executable instructions may further cause the user interface to present an indication of a fuel level of the vehicle as represented by the at least one data point of the plurality of second fuel level data points for the plurality of second time periods, as compared to a fuel level of the vehicle as stored for a previous time which precedes the first time period.

The system may further comprise another device remote from the vehicle which includes a user interface and another processor, and the processor executable instructions may further cause the system to: determine, by the other processor, a rate of change of a fuel level of the vehicle over time, based on the at least one data point of the respective second fuel level data points for the plurality of second time periods; and present, by the user interface of the other device, a notification when the rate of change of the fuel level exceeds a change rate threshold. The processor-executable instructions which cause the other processor to determine the rate of change of a fuel level of the vehicle over time may cause the other processor to determine the rate of change of the fuel level further based on the first fuel level data point for the first time period. The processor-executable instructions which cause the other processor to determine the rate of change of a fuel level of the vehicle over time may cause the other processor to determine the rate of change of the fuel level further based on a fuel level of the vehicle as stored for a previous time which precedes the first time period.

According to yet another broad aspect, the present disclosure describes a method comprising: collecting, by at least one data collection device positioned at a vehicle, operation data representing kinetic operation of the vehicle; collecting, by the at least one data collection device, raw fuel level data indicative of a fuel level in a fuel tank of the vehicle; for a first time period following activation of the vehicle: combining, by at least one processor of the at least one data collection device, the raw fuel level data corresponding to the first time period to determine a first fuel level data point for the first time period representing an initial fuel level of the vehicle; and after the first time period, determining, by the at least one processor, a plurality of second fuel level data points for a plurality of second time periods, each second fuel level data point corresponding to a respective second time period of the plurality of second time periods, comprising for each second time period of the plurality of second time periods: identifying, for each data point of operation data in the second time period, whether the data point is within stability criteria; for each data point of operation data in the second time period which is within the stability criteria, including a corresponding data point of the raw fuel level data in a fuel level data subset; for each data point of operation data in the second time period which is outside the stability criteria, excluding a corresponding data point of the raw fuel level data from the fuel level data subset; and combining, by the at least one processor, the fuel level data in the fuel level data subset to determine a respective second fuel level data point for the second time period; transmitting, by the at least one communication interface of the at least one data collection device, the first data point for the first time period and at least one data point of the plurality of second fuel level data points for the plurality of second time periods.

The operation data may comprise movement speed data representing a movement speed of the vehicle; and the stability criteria may comprise a threshold in movement speed of the vehicle.

The operation data may comprise vehicle engine data representing a rotation speed of an engine of the vehicle; and the stability criteria may comprise a threshold in rotation speed of the engine of the vehicle. The stability criteria may comprise a co-efficient of variation of the rotation speed of the engine of the vehicle.

The operation data may comprise acceleration data representing acceleration of the vehicle; and the stability criteria may comprise a threshold magnitude of acceleration of the vehicle.

The operation data may comprise: movement speed data representing a movement speed of the vehicle, and acceleration data representing acceleration of the vehicle; the stability criteria may comprise a threshold in movement speed of the vehicle and a threshold magnitude of acceleration of the vehicle; and identifying whether each point of operation data is within the stability criteria may comprise identifying whether each point of operation data is within the threshold in movement speed of the vehicle and the threshold magnitude of acceleration of the vehicle.

The operation data may comprise: movement speed data representing a movement speed of the vehicle, and vehicle engine data representing a rotation speed of an engine of the vehicle; the stability criteria may comprise a threshold in movement speed of the vehicle and a threshold in rotation speed of the engine of the vehicle; and identifying whether each point of operation data is within the stability criteria may comprise identifying whether each point of operation data is within either of the threshold in movement speed of the vehicle or the threshold in rotation speed of the engine of the vehicle.

Combining the raw fuel level data corresponding to the first time period may comprise determining an average fuel level for the first time period by averaging data points in the raw fuel level data for the first time period.

Combining the fuel level data in the fuel level data subset may comprise determining an average fuel level for the respective second time period by averaging data points in the fuel level data subset for the respective second time period.

The method may further comprise receiving, by at least one communication interface of a server remote from the vehicle, the first fuel level data point for the first time period and the at least one data point of the respective second fuel level data points for the plurality of second time periods.

The method may further comprise generating a simplified fuel level dataset for the plurality of second time periods by selectively filtering the plurality of second fuel level data points for the plurality of second time periods; and transmitting at least one data point of the plurality of second fuel level data points for the plurality of second time periods may comprise transmitting the simplified fuel level dataset for the plurality of second time periods. Generating the simplified fuel level dataset for the plurality of second time periods by selectively filtering the plurality of second fuel level data points for the plurality of second time periods may comprise: identifying select data points from the plurality of second fuel level data points for inclusion in the simplified fuel level dataset, based on differences between the select data points and iteratively-defined reference lines through portions of the fuel level trend; and compiling the select data points as the simplified fuel level dataset, excluding data points which are not identified as select data points.

The method may further comprise receiving, by at least one communication interface of another device remote from the vehicle, the first fuel level data point for the first time period and the at least one data point of the plurality of second fuel level data points for the plurality of second time periods. The method may further comprise presenting, by a user interface of the other device, fuel level information for the vehicle as represented by the first fuel level data point for the first time period or the at least one data point of the plurality of second fuel level data points for the plurality of second time periods. The method may further comprise presenting, by a user interface of the another device, a notification when a fuel level of the vehicle falls below a fuel threshold, based on the at least one data point of the plurality of second fuel level data points for the plurality of second time periods. The method may further comprise presenting, by a user interface of the other device, an indication of a fuel level of the vehicle as represented by the at least one data point of the plurality of second fuel level data points for the plurality of second time periods, as compared to a fuel level of the vehicle as stored for a previous time which precedes the first time period.

The method may further comprise: determining, by at least one processor of the other device, a rate of change of a fuel level of the vehicle over time, based on the at least one data point of the respective second fuel level data points for the plurality of second time periods; and presenting, by a user interface of the other device, a notification when the rate of change of the fuel level exceeds a change rate threshold. Determining the rate of change of a fuel level of the vehicle over time may be further based on the first fuel level data point for the first time period. Determining the rate of change of a fuel level of the vehicle over time may be further based on a fuel level of the vehicle as stored for a previous time which precedes the first time period.

According to yet another broad aspect, the present disclosure describes a system comprising: at least one data collection device positioned at a vehicle; at least one first communication interface; at least one processor positioned at the vehicle; and at least one non-transitory processor-readable storage medium positioned at the vehicle, the at least one non-transitory processor-readable storage medium storing processor-executable instructions which, when executed by the at least one processor cause the system to: collect, by the at least one data collection device, operation data representing kinetic operation of the vehicle; collect, by the at least one data collection device, raw fuel level data indicative of a fuel level in a fuel tank of the vehicle; for a first time period following activation of the vehicle: combine, by the at least one processor of the at least one data collection device, the raw fuel level data corresponding to the first time period to determine a first fuel level data point for the first time period representing an initial fuel level of the vehicle; and after the first time period, determine, by the at least one processor, a plurality of second fuel level data points for a plurality of second time periods, each second fuel level data point corresponding to a respective second time period of the plurality of second time periods, comprising for each second time period of the plurality of second time periods: identifying, for each data point of operation data in the second time period, whether the data point is within stability criteria; for each data point of operation data in the second time period which is within the stability criteria, including a corresponding data point of the raw fuel level data in a fuel level data subset; for each data point of operation data in the second time period which is outside the stability criteria, excluding a corresponding data point of the raw fuel level data from the fuel level data subset; and combining, by the at least one processor, the fuel level data in the fuel level data subset to determine a respective second fuel level data point for the second time period; transmit, by the at least one first communication interface, the first data point for the first time period and at least one data point of the plurality of second fuel level data points for the plurality of second time periods.

The operation data may comprise movement speed data representing a movement speed of the vehicle; and the stability criteria may comprise a threshold in movement speed of the vehicle.

The operation data may comprise vehicle engine data representing a rotation speed of an engine of the vehicle; and the stability criteria may comprise a threshold in rotation speed of the engine of the vehicle. The stability criteria may comprise a co-efficient of variation of the rotation speed of the engine of the vehicle.

The operation data may comprise acceleration data representing acceleration of the vehicle; and the stability criteria may comprise a threshold magnitude of acceleration of the vehicle.

The operation data may comprise: movement speed data representing a movement speed of the vehicle, and acceleration data representing acceleration of the vehicle; the stability criteria may comprise a threshold in movement speed of the vehicle and a threshold magnitude of acceleration of the vehicle; and the processor executable instructions which cause the at least one processor to identify whether each point of operation data is within the stability criteria may cause the at least one processor to identify whether each point of operation data is within the threshold in movement speed of the vehicle and the threshold magnitude of acceleration of the vehicle.

The operation data may comprise: movement speed data representing a movement speed of the vehicle, and vehicle engine data representing a rotation speed of an engine of the vehicle; the stability criteria may comprise a threshold in movement speed of the vehicle and a threshold in rotation speed of the engine of the vehicle; and the processor-executable instructions which cause the at least one processor to identify whether each point of operation data is within the stability criteria may cause the at least one processor to identify whether each point of operation data is within either of the threshold in movement speed of the vehicle or the threshold in rotation speed of the engine of the vehicle.

The processor-executable instructions which cause the at least one processor to combine the raw fuel level data corresponding to the first time period may cause the at least one processor to determine an average fuel level for the first time period by averaging data points in the raw fuel level data for the first time period.

The processor-executable instructions which cause the at least one processor to combine the fuel level data in the fuel level data subset may cause the at least one processor to determine an average fuel level for the respective second time period by averaging data points in the fuel level data subset for the respective second time period.

The system may further comprise a server remote from the vehicle including at least one second communication interface, and the processor-executable instructions may further cause the at least one second communication interface to receive the first fuel level data point for the first time period and the at least one data point of the respective second fuel level data points for the plurality of second time periods.

The processor-executable instructions may further cause the at least one processor to generate a simplified fuel level dataset for the plurality of second time periods by selectively filtering the plurality of second fuel level data points for the plurality of second time periods; and the processor-executable instructions which cause the at least one first communication interface to transmit at least one data point of the plurality of second fuel level data points for the plurality of second time periods may cause the at least one first communication interface to transmit the simplified fuel level dataset for the plurality of second time periods. The processor-executable instructions which cause the at least one processor to generate the simplified fuel level dataset for the plurality of second time periods by selectively filtering the plurality of second fuel level data points for the plurality of second time periods may cause the at least one processor to: identify select data points from the plurality of second fuel level data points for inclusion in the simplified fuel level dataset, based on differences between the select data points and iteratively-defined reference lines through portions of the fuel level trend; and compile the select data points as the simplified fuel level dataset, excluding data points which are not identified as select data points.

The system may further comprise at least one second communication interface of another device remote from the vehicle, and the processor-executable instructions may further cause the at least one second communication interface to receive the first fuel level data point for the first time period and the at least one data point of the plurality of second fuel level data points for the plurality of second time periods. The system may further comprise a user interface at the other device remote from the vehicle, and the processor-executable instructions may further cause the user interface to present fuel level information for the vehicle as represented by the first fuel level data point for the first time period or the at least one data point of the plurality of second fuel level data points for the plurality of second time periods. The system may further comprise a user interface at the other device remote from the vehicle, and the processor-executable instructions may further cause the user interface to present a notification when a fuel level of the vehicle falls below a fuel threshold, based on the at least one data point of the plurality of second fuel level data points for the plurality of second time periods.

The system may further comprise a user interface at the other device remote from the vehicle, and the processor-executable instructions may further cause the user interface to present an indication of a fuel level of the vehicle as represented by the at least one data point of the plurality of second fuel level data points for the plurality of second time periods, as compared to a fuel level of the vehicle as stored for a previous time which precedes the first time period.

The system may further comprise another device remote from the vehicle which includes a user interface and another processor, and the processor executable instructions may further cause the system to: determine, by the other processor, a rate of change of a fuel level of the vehicle over time, based on the at least one data point of the respective second fuel level data points for the plurality of second time periods; and present, by the user interface of the other device, a notification when the rate of change of the fuel level exceeds a change rate threshold. The processor-executable instructions which cause the other processor to determine the rate of change of a fuel level of the vehicle over time may cause the other processor to determine the rate of change of the fuel level further based on the first fuel level data point for the first time period. The processor-executable instructions which cause the other processor to determine the rate of change of a fuel level of the vehicle over time may cause the other processor to determine the rate of change of the fuel level further based on a fuel level of the vehicle as stored for a previous time which precedes the first time period.

BRIEF DESCRIPTION OF THE DRAWINGS

Exemplary non-limiting embodiments are described with reference to the accompanying drawings in which:

FIGS. 13, 14, 15, and 16 illustrate exemplary user interfaces for presenting fuel level information, in accordance with at least four illustrated implementations.

DETAILED DESCRIPTION

The present disclosure details systems, devices, methods, and models for determining fuel level of vehicles. Accurate fuel level information for vehicles helps to effectively manage the vehicles, particularly in a fleet setting. As non-limiting examples, accurate fuel level information can be used to determine whether a particular vehicle will be able to complete an upcoming journey or route, to plan optimal times and locations for refilling fuel, for selecting an appropriate vehicle to fulfill a particular task, or any other appropriate use. It is preferable that such accurate fuel level information be made available to a management device which manages vehicles in the fleet, such as a central management server.

Figure 1:
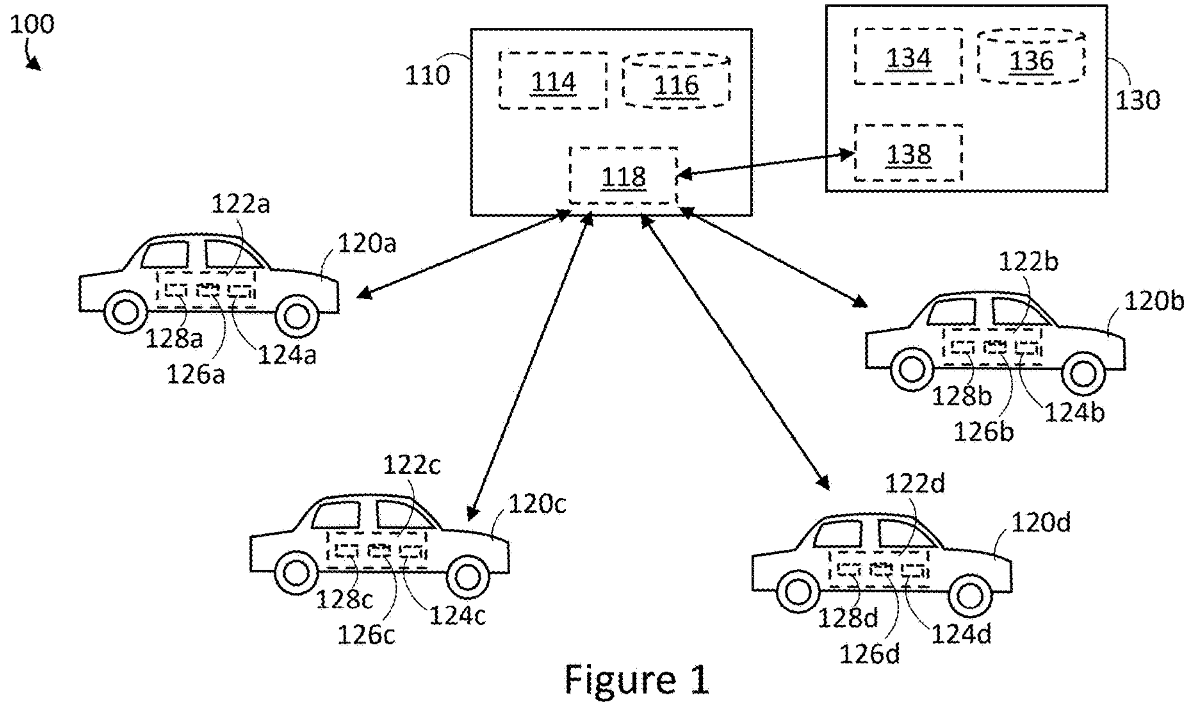
FIG. 1 is a schematic view of a system for managing data for a plurality of vehicles.

FIG. 1 is a schematic view of a system 100 for managing data for a plurality of vehicles. FIG. 1 shows a management device 110, which includes at least one processor 114, at least one non-transitory processor-readable storage medium 116, and a communication interface 118. Although illustrated as one device, management device 110 can include a plurality of devices, a plurality of processors 114, a plurality of non-transitory processor-readable storage mediums 116, and/or a plurality of communication interfaces 118. Further, such a plurality of management devices can be in close proximity (e.g. in a central server location), or can be distributed across different locations (e.g. as remote devices). Communication interface 118 can be a wired or wireless interface, through which management device 110 communicates with other devices, such as a plurality of vehicles, vehicle devices, or user devices.

In the illustrated example, management device 110 is shown as communicating with vehicle devices in four vehicles 120*a*, 120*b*, 120*c*, and 120*d* (collectively referred to as vehicles 120). However, management device 110 could communicate with vehicle devices in any appropriate number of vehicles, such as one vehicle, dozens of vehicles, hundreds of vehicles, thousands of vehicles, or even more vehicles. In some exemplary implementations, management device 110 is a telematics server, which collects and stores telematics data for a fleet of vehicles. In other exemplary implementations, management device 110 is a location-specific device, which manages vehicles for a particular location (or vehicles for a plurality of locations). In any of these examples, management device 110 can be used to monitor fuel level for vehicles, and thus can be used to assign vehicles as appropriate based on fuel level.

Vehicle 120*a* includes at least one processor 124*a*, at least one non-transitory processor-readable storage medium 126*a*, and a communication interface 128*a*. Together, the at least one processor 124*a*, the at least one non-transitory processor-readable storage medium 126*a*, and the communication interface 128*a* can be referred to as "vehicle device" 122*a*.

Vehicle 120*b* includes at least one processor 124*b*, at least one non-transitory processor-readable storage medium 126*b*, and a communication interface 128*b*. Together, the at least one processor 124*b*, the at least one non-transitory processor-readable storage medium 126*b*, and the communication interface 128*b* can be referred to as "vehicle device" 122*b*.

Vehicle 120*c* includes at least one processor 124*c*, at least one non-transitory processor-readable storage medium 126*c*, and a communication interface 128*c*. Together, the at least one processor 124*c*, the at least one non-transitory processor-readable storage medium 126*c*, and the communication interface 128*c* can be referred to as "vehicle device" 122*c*.

Vehicle 120*d* includes at least one processor 124*d*, at least one non-transitory processor-readable storage medium 126*d*, and a communication interface 128*d*. Together, the at least one processor 124*d*, the at least one non-transitory processor-readable storage medium 126*d*, and the communication interface 128*d* can be referred to as "vehicle device" 122*d*.

Collectively, vehicle 120*a*, vehicle 120*b*, vehicle 120*c*, and vehicle 120*d* can be referred to as "vehicles 120". Collectively, the at least one processor 124*a*, the at least one processor 124*b*, the at least one processor 124*c*, and the at least one processor 124*d* can be referred to as "processors 124". Collectively, the at least one non-transitory processor-readable storage medium 126*a*, the at least one non-transitory processor-readable storage medium 126*b*, the at least one non-transitory processor-readable storage medium 126*c*, and the at least one non-transitory processor-readable storage medium 126*d* can be referred to as "non-transitory processor-readable storage mediums 126". Collectively, communication interface 128*a*, communication interface 128*b*, communication interface 128*c*, and communication interface 128*d* can be referred to as "communication interfaces 128". Collectively, vehicle device 122*a*, vehicle device 122*b*, vehicle device 122*c*, and vehicle device 122*d* can be referred to as "vehicle devices 122".

Any of the communication interfaces 128 can be a wired interface or a wireless interface, or a vehicle device can include both a wired communication interface and a wireless communication interface.

Each of vehicle devices 122 can be a monolithically packaged device (i.e. a device contained in a single housing) which is installed in a respective vehicle. For example, any of vehicle devices 122 could be a telematics device, which plugs into the respective vehicle (e.g. at the OBDII port). Such telematics devices can gather vehicle information from the vehicle, from sensors built into the telematics device itself, and communicate said information to management devices such as management device 110. An exemplary telematics device is discussed later with reference to FIG. 2. In some implementations, each vehicle device 122 can instead refer to the collection of components installed in a vehicle (i.e. they do not have to be packaged in a single housing). As an example, a vehicle manufacturer could install processing, storage, and communication equipment in vehicles for the purpose of collecting, processing, and transmitting data. Further, components of any of the vehicle devices 122 can be multi-purpose components which serve other functions within the vehicle.

Management device 110 can communicate with vehicle devices 122 over a communication network, which may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. The communication network may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. The communication network may take other forms as well.

FIG. 1 also shows an optional device 130, which includes at least one processor 134, at least one non-transitory processor-readable storage medium 136, and a communication interface 138. Although illustrated as one device, device 130 can include a plurality of devices, a plurality of processors 134, a plurality of non-transitory processor-readable storage mediums 136, and/or a plurality of communication interfaces 138. Further, such a plurality of devices can be in close proximity (e.g. in a central server location), or can be distributed across different locations (e.g. as remote devices). Communication interface 138 can be a wired or wireless interface, through which device 130 communicates with other devices.

In the illustrated example, device 130 communicates with management device 110 via communication interfaces 118 and 138. Such communication can be direct or indirect (e.g. over the internet or any other network). Device 130 can perform processing and provide data to management device 110, which management device 110 in turn uses to manage at least one fleet or group of vehicles (e.g. vehicles 120). As an example, management device 110 may be owned by one entity, which manages a fleet of vehicles. Device 130 may belong to another entity, which provides services to many fleets of vehicles. As a result, device 130 may have access to more vehicle data (i.e. data from a larger quantity of vehicles) compared to management device 110. In an exemplary use case, device 130 may generate metrics, models, or profiles for at least one plurality of vehicles, based on a large amount of vehicle data available to device 130. In this exemplary use case, device 130 communicates such metrics, models, or profiles to management device 110, which management device 110 then uses to perform analysis, assessment, or prediction for similar vehicles in a fleet managed by management device 110 (e.g. vehicles 120). In this way, management device 110 can assess models for vehicles based on a large amount of statistical data that management device 110 itself does not have access to. As another example, management device 110 may be a management device for a specific location (e.g. vehicle lot, warehouse, or hub), such that management device 110 manages vehicles which operate out of said location. In such an example, device 130 may be a fleet management device, which manages vehicles in a fleet across multiple locations (e.g. all locations, or a subset of locations).

Figure 2:
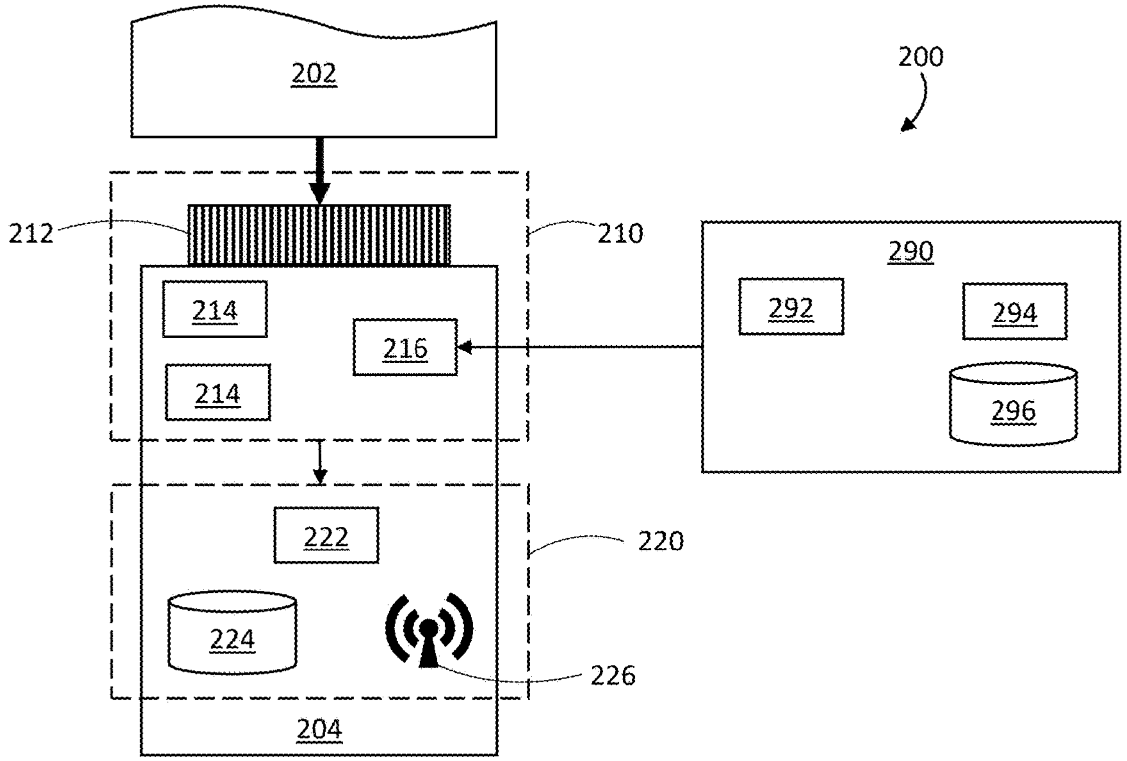
FIG. 2 is a schematic diagram of a system including a vehicle device, in accordance with at least one illustrated implementation.

FIG. 2 is a schematic diagram of a system 200, including a telematic device 204 which communicatively couples to a vehicle by a port 202 of the vehicle. Telematic device 204 is one exemplary implementation of a vehicle device, such as vehicle devices 122 discussed earlier with reference to FIG. 1. Telematic device 204 includes components which are, in the illustration of FIG. 2, grouped logically into sensor interface components 210 and control components 220. No physical or spatial grouping of these components is necessary, but rather the grouping discussed herein is a logical delineation for ease of discussion.

Sensor interface 210 is shown as including a communication interface 212 configured to interface with matching port 202 in a vehicle (such as any of vehicles 120 in FIG. 1). In an exemplary implementation, port 202 is a diagnostic port (such as an OBDII port) of the vehicle, and communication interface 212 is a matching diagnostic port plug (such as a plug which fits in an OBDII port). Other forms and standards of ports and communication interfaces are possible, as appropriate for a given application. Data from the vehicle (such as sensor data from one or more sensors of the vehicle) is provided to sensor interface 210 of telematic device 204 via port 202 and communication interface 212. Vehicle sensors can include, as non-limiting examples, a speed sensor, an inertial sensor, an RPM sensor, a fuel level sensor, a battery temperature sensor, an ambient temperature sensor, a battery voltage sensor, a battery charge sensor, a location sensor, and any other appropriate sensors which collect vehicle-related data.

Sensor interface 210 is also shown as including at least one sensor 214. In the illustrated example, two sensors 214 are illustrated, but any appropriate number of sensors could be included as appropriate for a given application. Data pertinent to the vehicle can be collected by sensors such as sensor 214. In this way, data can be collected which is not collected by sensors in the vehicle, or is not reported over an accessible port such as port 202. Sensors 214 could include, as non-limiting examples, a speed sensor, an inertial sensor, an ambient temperature sensor, a location sensor, an image sensor (e.g. camera), and any other appropriate sensors which collect vehicle-related data.

Sensor interface 210 is also shown as including a communication interface 216, which communicates with an optional peripheral device 290. Peripheral device 290 includes at least one sensor 292, and can provide data collected by the at least one sensor 292 to telematics device 204 via communication interface 216. In this way, data can be collected which is not collected by sensors in the vehicle, is not reported over an accessible port such as port 202, or is not collected by sensors in telematic device 204. The at least one sensor 292 could include, as non-limiting examples, a speed sensor, an inertial sensor, an ambient temperature sensor, a location sensor, an image sensor (e.g. camera), a fuel level sensor, and any other appropriate sensors which collect vehicle-related data.

Optionally, peripheral device 290 can also include at least one processor 294 and at least one processor 296. Peripheral device 290 can thus be used to perform acts of the methods discussed herein (by the at least one processor 292 executing processor-executable instructions stored at the at least one non-transitory processor-readable storage medium 296).

Communication interface 212 (and port 202), sensors 214, and communication interface 216 (and sensor 292) show multiple means by which telematics device 204 can collect sensor data. However, each of these components is not necessarily required. For example, any of communication interface 212, sensors 214, or communication interface 216 can be omitted, as long as one means of collecting sensor data remains.

Telematic device 204 (optionally in combination with peripheral device 290) can be implemented, for example, as any of vehicle devices 122 in FIG. 1. Telematic device 204 (optionally in combination with peripheral device 290) can also be used in the context of any of the methods discussed herein (in particular, method 400 in FIG. 4).

As mentioned earlier, telematics device 204, in the form illustrated in FIG. 2, is not strictly required to implement the systems, methods, devices, and models discussed herein. In alternative implementations, the components of telematic device 204 can be integrated within a vehicle (namely, any appropriate sensors, processors, non-transitory processor-readable storage mediums, communication interfaces, etc. can be components integrated in a vehicle, which serve similar functionality to telematic device 204.

As it regards particular sensor types and sensor data, several exemplary sensor types are of particular interest in this disclosure, and are discussed in detail below. The present disclosure is not limited to using data from these particular sensors (and several other sensor types are discussed above), nor is each of the particular sensors required in every implementation, but these particular sensors are called out as being especially valuable for the purposes discussed herein.

Any of the above discussed sensors or sensing modules (whether integrated in a vehicle or as part of a vehicle device or telematic device) can include a sensing module for determining vehicle location (also referred to as a location sensor). For instance, the sensing module may utilize Global Positioning System (GPS) technology (e.g., GPS receiver) for determining the geographic location (Lat/Long coordinates) of a vehicle. Alternatively, the sensing module utilizes another a global navigation satellite system (GNSS) technology, such as, GLONASS or BeiDou. Alternatively, the sensing module may further utilize another kind of technology for determining geographic location.

Alternatively, vehicle position information may be provided according to another geographic coordinate system, such as, Universal Transverse Mercator, Military Grid Reference System, or United States National Grid.

Any of the above discussed sensors or sensing modules can include a sensing module for determining an engine rotation speed for a vehicle (e.g. a tachometer). Engine rotation speed is typically expressed in revolutions per minute (RPM).

Any of the above discussed sensors or sensing modules can include a sensing module for determining movement speed for a vehicle. Vehicle movement speed can be expressed in any appropriate units, but is commonly expressed in miles per hour (mph), kilometers per hour (km/h), or meters per second (m/s). The speed sensor may be a sensor which measures data which is not directly movement speed of the vehicle, but is data from which movement speed of the vehicle can be derived. In some implementations, movement speed can be derived from location data measured by a location sensor (by determining change in location over time). In some implementations, movement speed can be derived from engine rotation speed data (based on a correlation in engine rotation speed and corresponding movement speed of the vehicle), or can be derived based on wheel rotation speed of the vehicle (which can itself be based on engine rotation speed, or measured by a specific wheel rotation speed sensor). For example, if wheels of a vehicle are of a known size, then distance travelled by the vehicle per wheel rotation (wheel circumference) is also known, such that a correlation can be established between time per wheel rotation and distance travelled per wheel rotation.

Any of the above discussed sensors or sensing modules can include a sensing module for determining acceleration of a vehicle, such as an accelerometer or IMU (inertial measurement unit).

Any of the above discussed sensors or sensing modules can include a fuel sensor or plurality of fuel sensors. Fuel sensors can be implemented and integrated within a vehicle. As a specific example, a fuel sensor can comprise a series of optical sensors positioned within a fuel tank of a vehicle. These optical sensors can detect the presence of fluid in front of the respective optical sensor. By positioning these optical sensors at specific heights in the fuel tank, fuel level can be measured by identifying which of the optical sensors have fluid in front, and which optical sensors do not. As another specific example, a float sensor could be integrated within a fuel tank of a vehicle. As yet another specific example, an ultrasonic fuel sensor can be positioned within a fuel tank of a vehicle. Fuel level as measured by such sensors can be reported to a vehicle control unit, and is used to inform a position of a fuel reading on a dashboard display of the vehicle. Further, such fuel data can also be reported over a diagnostic or communication interface of the vehicle (such as an OBDII port). A vehicle device (such as any of vehicle devices 122 or telematic device 204) can receive the fuel level data over the communication interface of the vehicle.

In other implementations, a fuel level sensor could be implemented which is not integrated with the vehicle. For example, a fuel level sensor could be implemented which communicates wirelessly with a vehicle device (e.g. as a peripheral device which communicates with telematic device 204). Such a fuel level sensor could be an optical or float sensor which is inserted into a vehicle fuel tank, as examples.

Figure 3:
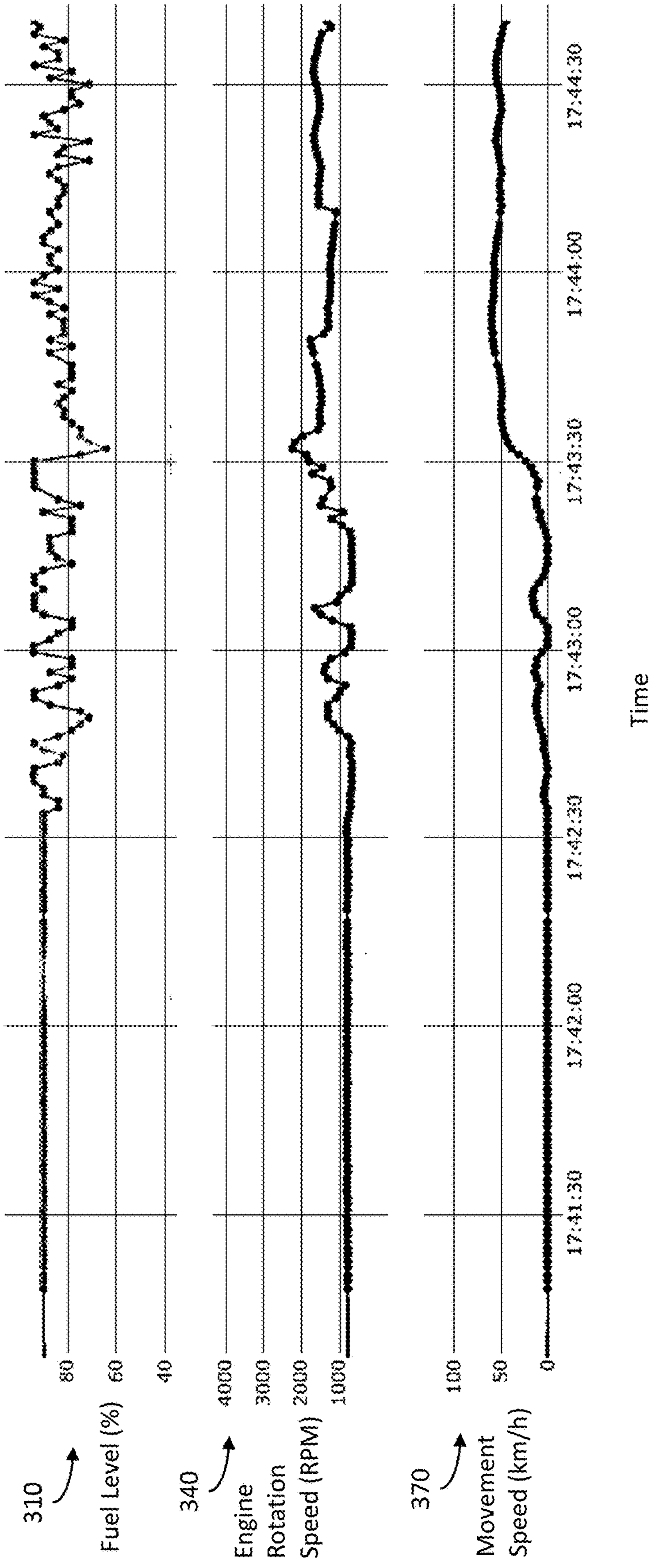
FIG. 3 illustrates three plots of fuel level and operation data over time, in accordance with at least one illustrated scenario.

FIG. 3 is a plot diagram illustrating three time-synchronized data sets across three plots.

Plot 310 shows Fuel Level over time, expressed as a percentage. Fuel Level percentage can range from 0% (tank is read by fuel level sensors as empty) to 100% (fuel tank is read by fuel level sensors as full). A fuel level reading of 0% does not necessarily correspond to the fuel tank actually being exactly empty, nor does a fuel level reading of 100% necessarily correspond to the fuel tank being exactly full. Rather, the range of 0% to 100% typically represents a range which the fuel sensor covers (e.g. a range over which optical sensors are positioned, in the example where optical sensors are used). A fuel tank often still holds a small amount of fuel even when the fuel level sensor indicates 0%, and can often be filled to hold more fuel than what the fuel level sensor indicates 100%.

Plot 310 indicates raw data as measured by a fuel level sensor. As is evident from plot 310, the fuel level data swings significantly when the vehicle is in operation. For example, at approximately time 17:43:30, the fuel level sensor indicates a fuel level of about 100%, whereas at approximately time 17:43:32 (two seconds later), the fuel level reading drops to about 62%. These swings in fuel level data are commonly due to "sloshing", which refers to the fuel moving, shifting, and splashing within the fuel tank, as is normal for fluids during motion or transport. That being said, fuel level data swings can also be caused by other factors, such as engine vibration, infrastructure movement (e.g. bridge swaying), road slope (which causes shifting of the fuel), or many other factors. As a result of all these factors, it is difficult to obtain a meaningful fuel level reading directly from a fuel level sensor. It is an objective of the present disclosure to provide solutions for handling noisy or problematic data such as fuel level data.

One possibility for determining a consistent fuel level is to average the fuel level data over a significant period of time (e.g. 20 minutes) or using a significant number of fuel level sensor data points (e.g. over 200 points). However, this is prone to issues. For example, such a strategy does not account for persistent or long term inaccuracies in fuel level data, such as situations where a vehicle is driving on a sloped road for a period of time. Further, such a strategy is also slow to update sudden changes in actual fuel level, such as refilling the fuel tank, siphoning fuel from the fuel tank, or a leak in the fuel tank. Thus, it is a further objective of the present disclosure to provide means for accurately determining fuel level, in a way that is quick to identify sudden changes in actual fuel level.

FIG. 3 also shows plot 340, which indicates Engine Rotation Speed as expressed in RPM. FIG. 3 also shows plot 370, which shows vehicle Movement Speed expressed in km/h. Engine rotation speed and/or vehicle movement speed are examples of data which can be used to identify stable fuel level data, as discussed in detail later.

Figure 4:
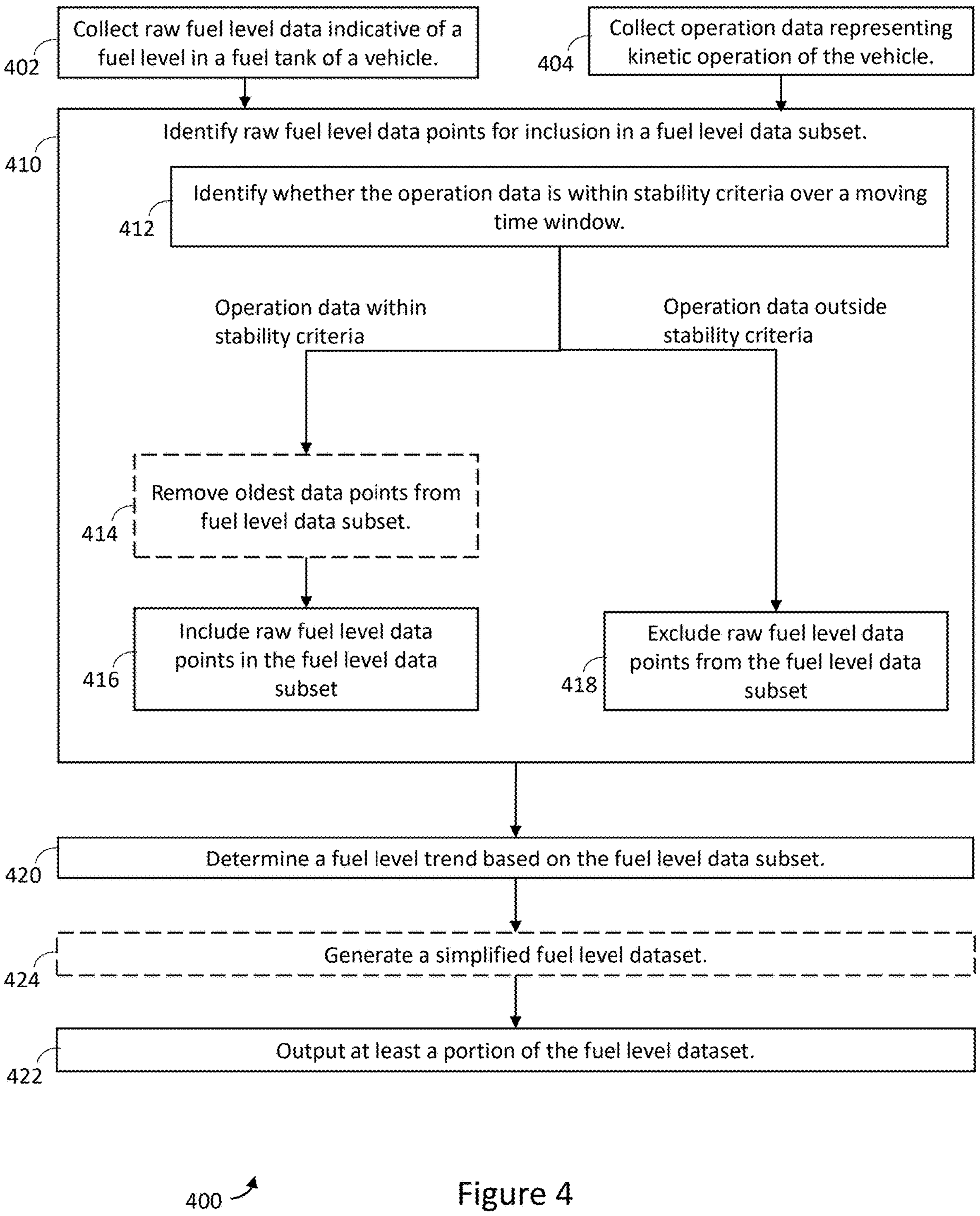
FIG. 4 is a flowchart diagram which illustrates an exemplary method for determining fuel level.

FIG. 4 is a flowchart diagram which illustrates an exemplary method 400 for determining fuel level of a vehicle. Method 400 as illustrated includes acts 402, 404, 410 (including sub-acts 412, 414, 416, and 418), 420, 424, and 422. One skilled in the art will appreciate that additional acts could be added, acts could be removed, or acts could be reordered as appropriate for a given application. For example, acts 414 and 424 are shown in dashed lines, to emphasize that these acts are optional. With reference to the example illustrated in FIG. 1, acts can be performed by appropriate components of management device 110, vehicle devices 122, or optional device 130. For example, acts of identification, determination, generation, or general data manipulation can be performed by at least one appropriate processor (e.g. processors 114, 124, 134, 222, or 294). Further, any of the at least one non-transitory processor-readable storage mediums 116, 126, or 136 could have instructions stored thereon, which when executed by a respective at least one processor (processors 114, 124, 134, 222, or 294) cause the respective management device 110, vehicle device 122, or optional device 130 to perform a given act of method 400. An act being performed by at least one processor 124 refers to the act being performed by any of processors 124*a*, 124*b*, 124*c*, or 124*d*. An act being performed by at least one non-transitory processor-readable storage medium 126 refers to the act being performed by any of non-transitory processor-readable storage mediums 126*a*, 126*b*, 126*c*, or 126*d*. An act being performed by communication interface 128 refers to the act being performed by any of communication interfaces 128*a*, 128*b*, 128*c*, or 128*d*. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122*a*, 122*b*, 122*c*, or 122*d* (or any other similar vehicle device). Generally speaking, in the context of method 400 acts of identification and determination are performed by at least one processor (e.g. any of processors 114, 124, 134, 222, or 294). Thus, reference to an act of identifying or determining being performed by a particular device generally refers to the act being performed by at least one processor of the device.

At 402, raw fuel level data is collected. The raw fuel level data is indicative of a fuel level in a fuel tank of a vehicle, as discussed earlier. In some implementations, collecting the raw fuel level data comprises capturing, by a fuel level sensor, the raw fuel level data. That is, in some implementations the fuel level sensor itself is included in the scope of method 400 (or the system which performs method 400). In other implementations, collecting the raw fuel level data comprises receiving the raw fuel level data as captured by a fuel level sensor (that is, the fuel level sensor itself is outside of the scope of method 400, or the system which performs method 400). Such receiving of the raw fuel level data can occur for example over a communication interface between a vehicle and a vehicle device (such as communication interface 212 in FIG. 2, which connects a vehicle port 202 to a telematic device 204). Generally throughout this disclosure, "receiving" of data can refer to any appropriate actions by which data is taken in and handled, such as routing, processing, decompressing, decrypting, decoding, formatting, or any other appropriate action.

At 404, operation data is collected. The operation data is indicative of kinetic operation of the vehicle. As non-limiting examples, the operation data can include any or all of engine rotation speed data, vehicle speed data, and/or acceleration data, as discussed earlier. In some implementations, collecting the operation data comprises capturing, by an operation sensor (e.g. movement speed sensor, location sensor, rotation speed sensor, accelerometer, IMU, or any other appropriate sensor) the operation data. That is, in some implementations the operation sensor itself is included in the scope of method 400 (or the system which performs method 400). The operation sensor can be integrated within a vehicle, or can be included in a vehicle device which couples to a vehicle (as discussed earlier with reference to vehicle devices 122 and telematic device 204). In other implementations, collecting the operation data comprises receiving the operation data as captured by an operation sensor (that is, the operation sensor itself is outside of the scope of method 400, or the system which performs method 400). Such receiving of the operation data can occur for example over a communication interface between a vehicle and a vehicle device (such as communication interface 212 in FIG. 2, which connects a vehicle port 202 to a telematic device 204).

At 410, raw fuel level data points are identified for inclusion in a fuel level data subset. Act 410 is intended to identify a subset of fuel level data points where the fuel level is expected to be stable, such that the subset of fuel level data points provides a more accurate indication of actual fuel level of the vehicle. Act 410 includes sub acts 412, 416, and 418, and can include optional sub act 414 in some implementations.

At 412, at least one processor of the system or device which performs method 400 (e.g. any of processors 114, 124, 134, 222, or 294, as examples) identifies whether the operation data is within stability criteria over a moving time window. In particular, the operation data is analyzed relative to stability criteria within a particular instance of the moving time window, after which the moving time window is incremented in time, and analysis of data is performed again on operation data in the incremented time window. This incrementation is how the time window is "moved". These steps of analysis and incrementation can be repeated for as long as desired (e.g. for as long as the vehicle engine is active).

Figure 5:
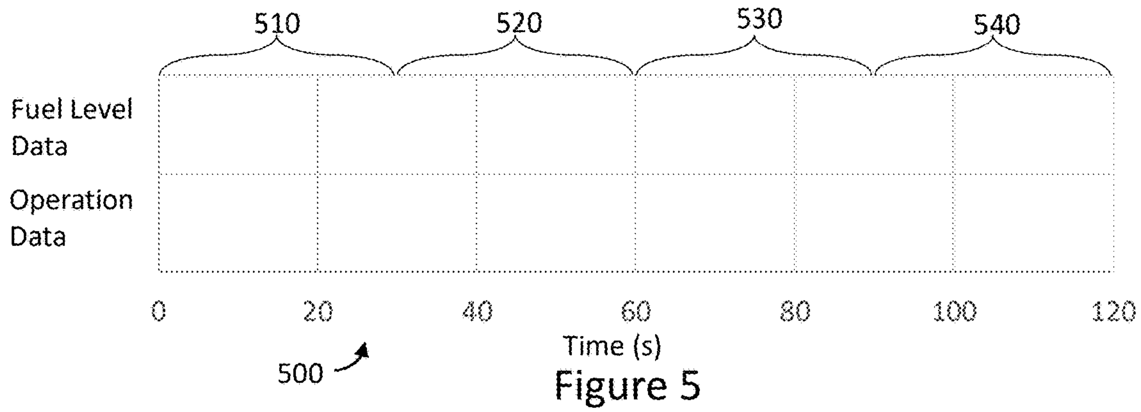
FIGS. 5, 6, and 7 illustrate exemplary moving time windows, in accordance with at least illustrated implementations.
Figure 6:
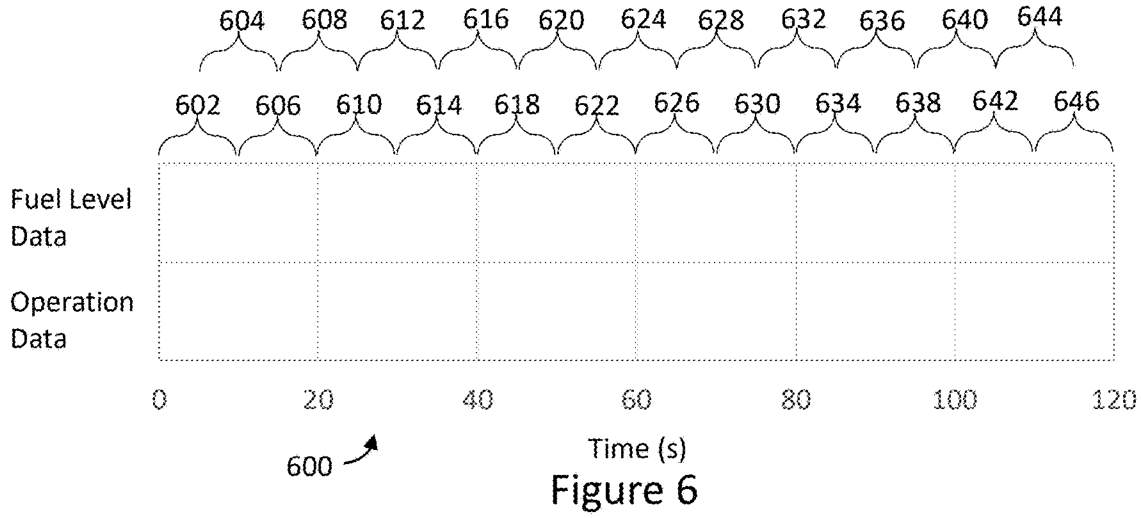
Figure 7:
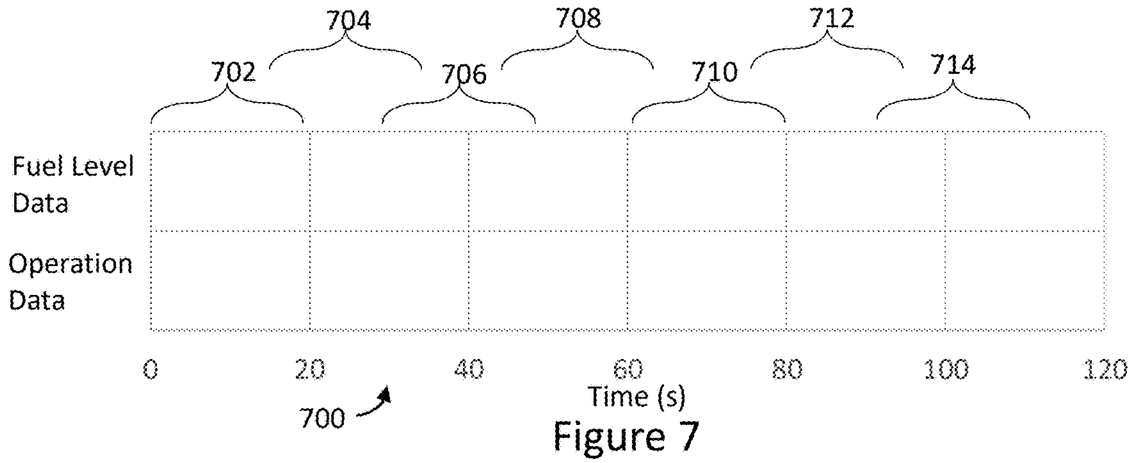

FIGS. 5, 6, and 7 discussed below illustrate exemplary moving time windows in this regard.

FIGS. 5, 6, and 7 illustrate exemplary plots of operation data and fuel level data over time (in particular over 120 seconds, though any appropriate amount of time could be used instead). To reduce clutter, the plots in FIGS. 5, 6, and 7 are not actually populated with operation data or fuel level data, as the purpose of these Figures is to illustrate the concept of moving time windows.

FIG. 5 shows plot 500, with four instances 510, 520, 530, and 540 of a moving time window. The moving time window in the example of FIG. 5 is 30 seconds long, and an incrementation step size of the moving time window is 30 seconds. In accordance with sub-act 412 in method 400, operation data in instance 510 of the moving time window (which covers 0 seconds to 30 seconds) is analyzed to identify whether the operation data is within stability criteria. Afterwards, the moving time window is incremented to instance 520 of the moving time window (which covers 30 seconds to 60 seconds). In accordance with sub-act 412 in method 400, operation data in instance 520 of the moving time window is analyzed to identify whether the operation data is within stability criteria. Afterwards, the moving time window is incremented to instance 530 of the moving time window (which covers 60 seconds to 90 seconds). In accordance with sub-act 412 in method 400, operation data in instance 530 of the moving time window is analyzed to identify whether the operation data is within stability criteria. Afterwards, the moving time window is incremented to instance 540 of the moving time window (which covers 90 seconds to 120 seconds). In accordance with sub-act 412 in method 400, operation data in instance 540 of the moving time window is analyzed to identify whether the operation data is within stability criteria. This cycle of analysis and incrementation can be repeated as long as appropriate (e.g. for as long as the vehicle engine is on).

In the example of FIG. 5, the duration of the moving time window (30 seconds) is equal to the incrementation step size (30 seconds). Consequently, there is no overlap between consecutive instances of the moving time window. This advantageously reduces the amount of analysis performed on the same data, and therefore reduces processing burden of method 400. However, this implementation may also miss windows of operation data which are within the stability criteria, but are not within a single instance of the moving time window (for example, a 30 second long segment of stable operation data which spans two different instances of the moving time window). Thus this implementation may not be as accurate as desired.

FIG. 6 shows plot 600, with 23 instances 602, 604, 606, 608, 610, 612, 614, 616, 618, 620, 622, 624, 628, 630, 632, 634, 636, 638, 640, 642, 644, and 646 of a moving time window. The moving time window in the example of FIG. 6 is 10 seconds long, and an incrementation step size of the moving time window is 5 seconds. In accordance with sub-act 412 in method 400, operation data in instance 602 of the moving time window (which covers 0 seconds to 10 seconds) is analyzed to identify whether the operation data is within stability criteria. Afterwards, the moving time window is incremented to instance 604 of the moving time window (which covers 5 seconds to 15 seconds). In accordance with sub-act 412 in method 400, operation data in instance 604 of the moving time window is analyzed to identify whether the operation data is within stability criteria. Afterwards, the moving time window is incremented to instance 606 of the moving time window (which covers 10 seconds to 20 seconds). In accordance with sub-act 412 in method 400, operation data in instance 606 of the moving time window is analyzed to identify whether the operation data is within stability criteria. Afterwards, the moving time window is incremented to instance 608 of the moving time window (which covers 15 seconds to 25 seconds). In accordance with sub-act 412 in method 400, operation data in instance 608 of the moving time window is analyzed to identify whether the operation data is within stability criteria. This cycle of analysis and incrementation can be repeated as long as appropriate (e.g. through each of the remaining instances 610, 612, 614, 616, 618, 620, 622, 624, 628, 630, 632, 634, 636, 638, 640, 642, 644, and 646 of the moving time window, and beyond).

In the example of FIG. 6, the duration of the moving time window (10 seconds) is greater than (double) the incrementation amount (5 seconds). Consequently, there is overlap between consecutive instances of the moving time window (a 50% overlap of 5 seconds). This advantageously increases the likelihood that operation data within the stability criteria will be identified, by performing a thorough analysis of the operation data compared to plot 500 in FIG. 5. However, this implementation may also have a higher processing burden than the example of FIG. 5.

FIG. 7 shows plot 700, with 7 instances 702, 704, 706, 708, 710, 712, and 714 of a moving time window. The moving time window in the example of FIG. 7 is 20 seconds long, and an incrementation step size of the moving time window is 15 seconds. In accordance with sub-act 412 in method 400, operation data in instance 702 of the moving time window (which covers 0 seconds to 20 seconds) is analyzed to identify whether the operation data is within stability criteria. Afterwards, the moving time window is incremented to instance 704 of the moving time window (which covers 15 seconds to 35 seconds). In accordance with sub-act 412 in method 400, operation data in instance 704 of the moving time window is analyzed to identify whether the operation data is within stability criteria. Afterwards, the moving time window is incremented to instance 706 of the moving time window (which covers 30 seconds to 50 seconds). In accordance with sub-act 412 in method 400, operation data in instance 706 of the moving time window is analyzed to identify whether the operation data is within stability criteria. Afterwards, the moving time window is incremented to instance 708 of the moving time window (which covers 45 seconds to 65 seconds). In accordance with sub-act 412 in method 400, operation data in instance 708 of the moving time window is analyzed to identify whether the operation data is within stability criteria. This cycle of analysis and incrementation can be repeated as long as appropriate (e.g. through each of the remaining instances 710, 712, and 714 of the moving time window, and beyond).

In the example of FIG. 7, the duration of the moving time window (20 seconds) is greater than the incrementation step size (15 seconds). Consequently, there is overlap between consecutive instances of the moving time window (a 25% overlap of 5 seconds). This advantageously increases the likelihood that operation data within the stability criteria will be identified, by performing a thorough analysis of the operation data compared to plot 500 in FIG. 5. While this implementation may also have a higher processing burden than the example of FIG. 5, it should have a lower processing burden than the example of FIG. 6, where there is greater overlap between instances of the moving time window (and thus more redundant analysis of operation data).

The exact duration of moving time window, and the exact incrementation step size, can be determined as appropriate for a given application. In particular, different vehicle types, classes, and even individual vehicles can have different fuel level sensors, different fuel movement properties within a fuel tank, different movement properties, or many other differences which cause different levels of stability and correlation between operation data and fuel level data. Generally speaking, a longer duration of moving time window will likely identify the most stable operation data, but may also ignore operation data which is sufficiently stable, when compared to a shorter duration of moving time window. Further, a longer incrementation step size will generally reduce processing burden by reducing duplicate analysis on operation data, but may also result in some sufficiently stable operation data being ignored. Ideally, a good balance between processing burden and accuracy should be targeted. Example durations of moving time window can include for example anywhere between 4 seconds and 30 seconds (or shorter, or longer, as appropriate for a given application). Example incrementation step sizes can include for example anywhere between 2 seconds and 30 seconds (or shorter, or longer, as appropriate for a given application).

Returning to method 400 in FIG. 4, at 416, raw fuel data points are included in the fuel level data subset, when appropriate. That is, when the operation data is within the stability criteria in the moving time window (as identified in sub-act 412), corresponding raw fuel level data points within the moving time window are included in the fuel level data subset. Stated differently, where the operation data in an instance of the moving time window is within the stability criteria, raw fuel level data within the same instance of the moving time window is included in the fuel level data subset. To reference the example of FIG. 5, if the operation data within instance 510 of the moving time window is within the stability criteria, raw fuel level data within instance 510 of the moving time window is included in the fuel level data subset.

Including raw fuel level data points in the fuel level data subset can in some implementations comprise at least one non-transitory processor-readable storage medium (e.g. any of mediums 116, 126, 136, 224, or 296) storing the raw fuel level data points in a stored fuel level data subset. In some implementations, including raw fuel level data points in the fuel level data subset can in some implementations comprise sending the raw fuel level data points to another device where the fuel level data subset is stored (e.g. via any of communication interfaces 118, 128, 138, 216, or 222, as examples).

Optionally, at sub-act 414, the oldest points of the fuel level data subset can be removed when (or before) including new raw fuel level data points in the fuel level data subset. In particular, the fuel level data subset may be constrained to a set number of data points (e.g. 50 data points, 100 data points, or any other appropriate number of data points). When the fuel level data subset includes the set number of data points (or adding more data points would cause the fuel level data subset to exceed the set number of data points), the oldest points in the fuel level data subset can be removed. For example, if the moving time window has a duration of 8 seconds, and the raw fuel level data has a frequency of 1 Hz, then including the raw fuel level data for a particular instance of the moving time window in the fuel level data subset would entail adding 8 data points to the fuel level data subset. In a case where the set number of data points is 100, and the fuel level data subset already includes 100 data points, the oldest 8 data points can be removed from the fuel level data subset, and the newly identified 8 raw fuel level data points can be included in the fuel level data subset. Alternatively, in a case where the fuel level data subset already includes 96 data points, the oldest 4 data points can be removed from the fuel level data subset, and the newly identified 8 raw fuel level data points can be included in the fuel level data subset, to bring the total number of data points in the fuel level data subset to 100.

In this way, the fuel level data subset can be a "rolling" data subset, where only a certain amount of fuel level data for relatively recent stable periods is included. This keeps the fuel level data subset up-to date and a more accurate reflection of current fuel level for the vehicle.

In some implementations, where the operation data is identified as being within the stability criteria for a particular instance of the moving window at 412, a single data point of the raw fuel level data may be included in the fuel level data subset at 416, regardless of how many raw fuel level data points are within the instance of the moving time window. Such an implementation aims to diversify the data in the fuel level data subset to be from a larger number of instances of moving time window.

At 418, raw fuel data points are excluded from the fuel level data subset, when appropriate. That is, when the operation data is outside the stability criteria in the moving time window (as identified in sub-act 412), corresponding raw fuel level data points within the moving time window are excluded from the fuel level data subset. Stated differently, where the operation data in an instance of the moving time window is outside of the stability criteria, raw fuel level data within the same instance of the moving time window is excluded from the fuel level data subset. To reference the example of FIG. 5, if the operation data within instance 510 of the moving time window is outside of the stability criteria, raw fuel level data within instance 510 of the moving time window is excluded from the fuel level data subset.

Excluding raw fuel level data from the fuel level data subset can be active (e.g. deletion of the raw fuel level data points, or actively labelling the raw fuel level data points as unsuitable), or can be passive (e.g. ignoring or passing over of the raw fuel level data points).

In some implementations, the fuel level data subset is retained even when the vehicle ignition is turned off. For example, the fuel level data subset can be stored in a persistent non-transitory processor-readable storage medium.

In some implementations, the fuel level data subset is reset in response to an ignition of the vehicle being turned off. In this context, "reset" means that the fuel level data subset can be cleared from storage, labelled as outdated, deindexed, or otherwise eliminated from future use in the context of method 400. Resetting the fuel level data subset advantageously eases identification of sudden fuel change events (e.g. fuel refilling or fuel siphoning), since these events typically occur when the vehicle is off. When the vehicle is activated again, the fuel level data subset can be populated by fresh fuel level data which reflects the sudden fuel change event.

Resetting the fuel level data subset in response to the ignition of the vehicle being turned off can comprise resetting the fuel level data subset during a shutdown cycle of the vehicle. That is, concurrently with the vehicle being powered down, the fuel level data subset can be cleared, labelled, deindexed, or otherwise marked as outdated. Alternatively, resetting the fuel level data subset in response to the ignition of the vehicle being turned off can comprise resetting the fuel level data subset some time after the vehicle is turned off. As one example, the fuel level data subset can be stored in a dynamic non-transitory processor-readable storage medium which requires constant or regular supply of power to maintain the data stored thereon. In such a case, turning off an ignition of the vehicle will result in passive resetting of the fuel level data subset. As another example, the fuel level data subset can be cleared during a startup cycle of the vehicle (which can only occur after an ignition of the vehicle has been previously turned off). That is, an active process can be initiated where the fuel level data subset is cleared, deleted, labelled, deindexed, or otherwise marked as outdated.

Ignition events by the vehicle (e.g. turning the ignition on or off) can be identified in a number of ways. As one example, the vehicle may include an ignition sensor or identifier, which outputs a signal when the vehicle ignition is active (or when the ignition state of the vehicle changes). Such a signal can be received by the vehicle device which collects sensor data and/or performs method 400. As another example, vehicle ignition events can be identified based on a voltage reading from a battery of the vehicle. In particular, when a vehicle ignition is activated, the battery supplies a significant amount of energy to start the vehicle, or "crank" the engine. This causes a dip in the battery voltage, which can be used to identify vehicle ignition or "cranking" events. At least one processor of the vehicle device can receive voltage data from the vehicle, and identify such voltage events.

Exemplary stability criteria are discussed below. These specific thresholds are merely non-limiting examples, and any appropriate threshold which effectively identifies stability of the vehicle could be utilized as appropriate for a given application.

In some implementations, the operation data comprises movement speed data representing a movement speed of the vehicle, as discussed earlier. The stability criteria can thus comprise a threshold in movement speed of the vehicle over time.

In an exemplary implementation, the stability criteria could comprise a threshold difference in movement speed of the vehicle over time. That is, the stability criteria can be defined such that no two movement speed data points in an instance of the moving time window are more than a set speed apart. For example, the stability criteria could be defined such that no two movement speed data points in an instance of the moving time window are more than 1 km/h, 5 km/h, 10 km/h apart, or any other appropriate value.

In another exemplary implementation, that stability criteria could comprise a threshold difference from a mean movement speed over the moving time window. For example, a mean movement speed over an instance of the moving time window can be determined (e.g. 50 km/h), and the stability criteria can be defined as a difference threshold from this mean movement speed (for example 1%, 5%, 10%, or any other appropriate value from the mean speed).

In yet another exemplary implementation, the stability criteria could comprise a median speed over the moving time window. For example, the stability criteria could be defined as requiring that median speed over an instance of the moving time window be 0. A median speed of 0 over an instance of a moving time window indicates that the vehicle is stopped for most of the instance.

In some implementations, the operation data comprises engine rotation speed data representing a rotation speed of an engine of the vehicle, as discussed earlier. The stability criteria can thus comprise a threshold in engine rotation speed of the vehicle over time.

In an exemplary implementation, the stability criteria could comprise a threshold difference in engine rotation speed of the vehicle over time. That is, the stability criteria can be defined such that no two engine rotation speed data points in an instance of the moving time window are more than a set rotation speed apart. For example, the stability criteria could be defined such that no two engine rotation speed data points in an instance of the moving time window are more than 10 RPM, 50 RPM, or 100 RPM apart, or any other appropriate value.

In another exemplary implementation, that stability criteria could comprise a threshold difference from a mean engine rotation speed over the moving time window. For example, a mean engine rotation speed over an instance of the moving time window can be determined (e.g. 1500 RPM), and the stability criteria can be defined as a difference threshold from this mean engine rotation speed (for example 1%, 5%, 10%, or any other appropriate value from the mean engine rotation speed).

In another exemplary implementation, that stability criteria could comprise a threshold co-efficient of variation of the engine rotation speed over the moving time window. In particular, co-efficient of variation (CV) is defined as the standard deviation in engine rotation speed divided by the mean engine rotation speed for the moving time window. In an example, the stability criteria can be defined such that CV must be less than 2.246 (or any other appropriate number) for the instance of the moving time window to be within the stability criteria.

In some implementations, the operation data comprises acceleration data representing acceleration of the vehicle, as discussed earlier. The stability criteria can thus comprise a threshold in acceleration of the vehicle over time.

In an exemplary implementation, the stability criteria could comprise a threshold acceleration magnitude for the vehicle. That is, the stability criteria can be defined such that each point of accelerometer data within the moving time window must be below a threshold magnitude. That is, the stability criteria can be defined such that the vehicle must not accelerate (positively or negatively) too greatly at any point in the instance of the moving time window for the raw fuel level data to be included in the fuel level data subset. For example, the stability criteria could be defined such that acceleration magnitude does not exceed 0.1 $m/s^2$, or any other appropriate value.

In another exemplary implementation, the stability criteria could comprise a threshold difference from a mean acceleration over the moving time window. For example, a mean acceleration over an instance of the moving time window can be determined (e.g. 0 $m/s^2$), and the stability criteria can be defined as a difference threshold from this mean acceleration (for example 0.1 $m/s^2$ or any other appropriate value) from the mean acceleration.

In another exemplary implementation, the stability criteria could comprise a threshold magnitude for a median acceleration over the moving time window. For example, a median acceleration over an instance of the moving time window can be determined (e.g. 0 $m/s^2$), and the stability criteria can be defined such that this median acceleration must be below a certain magnitude (for example 0.1 $m/s^2$ or any other appropriate value).

Several exemplary stability criteria are described above. These stability criteria are merely exemplary, and further are not exclusive to each other. In some implementations, the stability criteria may be defined based on multiple criteria, and/or based on multiple types of data from different data sources. In some cases, the stability criteria can require that multiple criteria be satisfied in order for the operation data to be within the stability criteria. In other cases that stability criteria can require that one or a subset of criteria be satisfied (from a greater set of criteria) in order for the operation data to be within the stability criteria. Such an example is discussed below.

In an exemplary implementation, the operation data comprises movement speed data representing a movement speed of the vehicle, and engine rotation speed data representing a rotation speed of an engine of the vehicle, as discussed earlier. The stability criteria can thus comprise a threshold in movement speed of the vehicle over time and a threshold in rotation speed of the engine of the vehicle over time. In this exemplary implementation, identifying whether the operation data is within stability criteria comprises identifying whether the operation data is within either the threshold in movement speed, or the operation data is within the threshold in engine rotation speed. In particular, the at least one processor can determine whether the movement speed data is within the threshold in movement speed. This can be performed using any of the examples described earlier, such as threshold difference in movement speed, threshold difference from mean movement speed, median speed, or any other appropriate example. Further, the at least one processor can determine whether the engine rotation speed data is within the threshold in engine rotation speed. This can be performed using any of the examples described earlier, such as threshold difference in engine rotation speed, threshold difference from a mean engine rotation speed, threshold co-efficient of variation, or any other appropriate example. If either threshold is satisfied, the stability criteria can be considered as satisfied.

By setting two (or more) different criteria for the stability criteria, either of which can be satisfied for the operation data to be identified as being within the stability criteria, stringency of the identification in act 412 of method 400 can be reduced, thereby providing more fuel level data for the fuel level subset. Further, fuel level data can be identified for inclusion in the fuel level data subset, even if operation data is temporarily unavailable. For example, in hybrid vehicles or plug-in hybrid vehicles, there can be long periods of time where engine rotation speed data is not available (because the vehicle relies on electrical energy and thus the engine is not used). By implementing another stability criteria which does not rely on engine rotation speed data, fuel level data can still be identified for inclusion in the fuel level data subset. In contrast, by setting two (or more) different criteria for the stability criteria, all of which must be satisfied for the operation data to be identified as being within the stability criteria, stringency of the identification in act 412 of method 400 can be increased, thereby limiting the fuel level data subset to only very particular data. These factors generally should be appropriately balanced to provide enough data in the fuel level data subset for meaningful interpretations (stability criteria is not overly stringent), while not polluting the fuel level data subset with poor quality fuel level data (i.e. stability criteria is not stringent enough).

Figure 8:
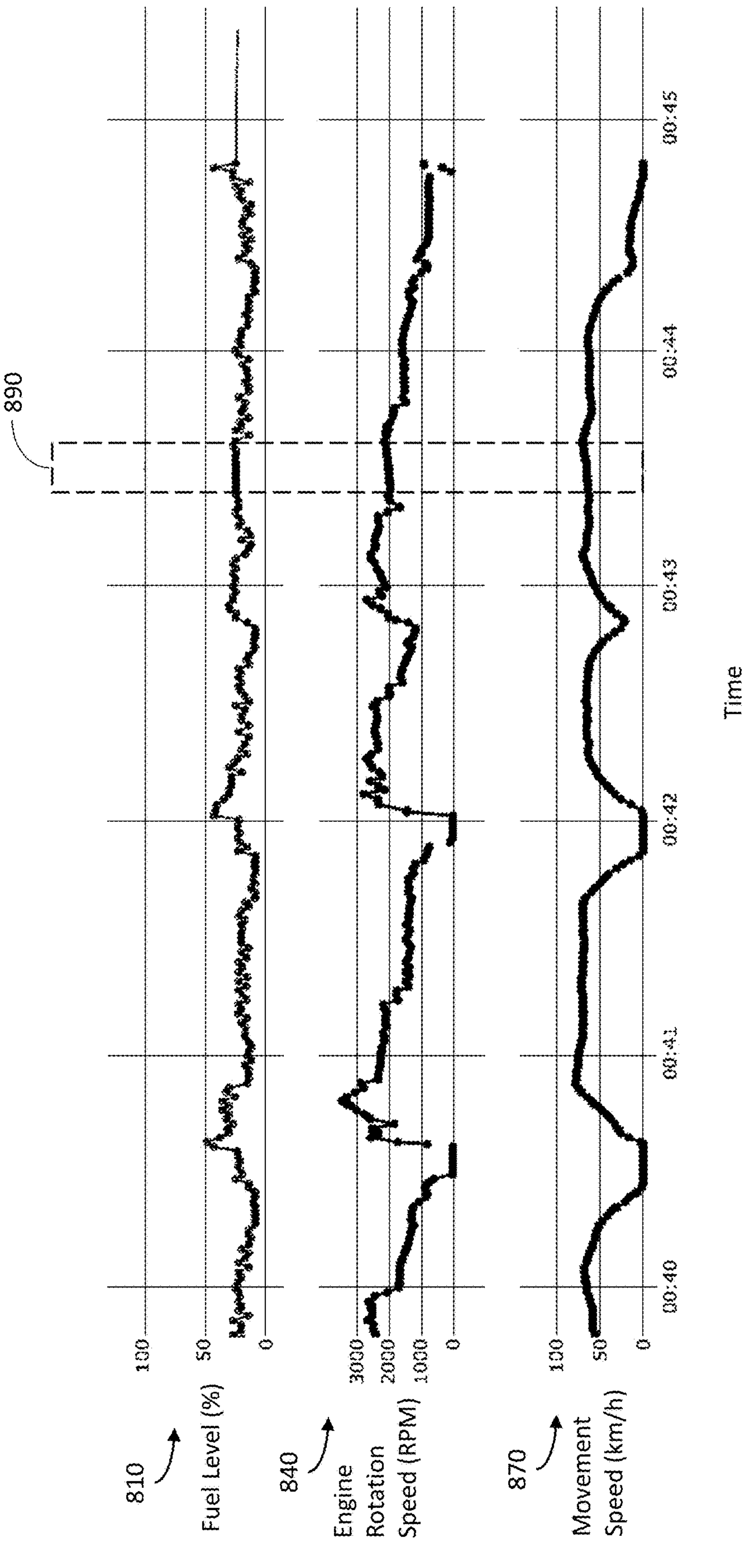
FIG. 8 illustrates three plots of fuel level and operation data over time, and an instance of a moving time window where operation data for a vehicle is stable, in accordance with at least one illustrated scenario.

FIG. 8 is a plot diagram illustrating three time-synchronized data sets across three plots, similar to FIG. 3 discussed earlier.

Plot 810 in FIG. 8 shows Fuel Level over time, expressed as a percentage. Fuel Level percentage can range from 0% (tank is read by fuel level sensors as empty) to 100% (fuel tank is read by fuel level sensors as full), as discussed earlier.

FIG. 8 also shows plot 840, which indicates Engine Rotation Speed as expressed in RPM. FIG. 8 also shows plot 870, which shows vehicle Movement Speed expressed in km/h. Engine rotation speed and/or vehicle movement speed can be collected as discussed earlier.

FIG. 8 also illustrates an instance of a moving time window 890, where operation data (in this example, engine rotation speed data and movement speed data) are within stability criteria. That is, both engine RPM and speed in km/h are stable over the time window 890; and as such the fuel level data in time window 890 can be included in a fuel level data subset in accordance with acts 412 and 416 of method 400. As evidence of the efficacy of this technique, the raw fuel level data in instance 890 of the moving time window is also very stable, as can be seen in FIG. 8.

Figure 9A:
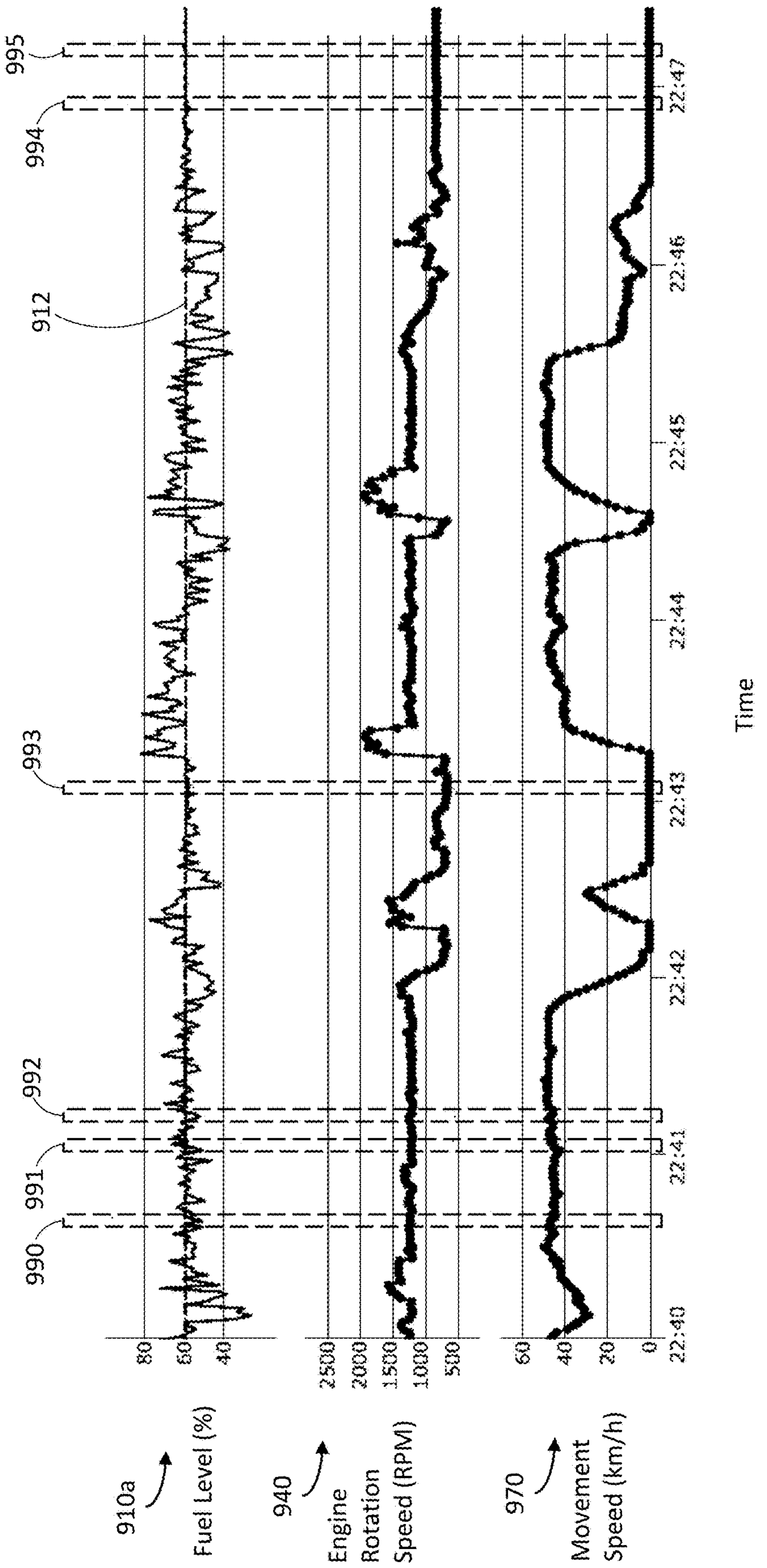
FIGS. 9A and 9B each illustrate three plots of fuel level and operation data over time, and a fuel level trend for stable regions of operation data, in accordance with at least one illustrated scenario.
Figure 9B:
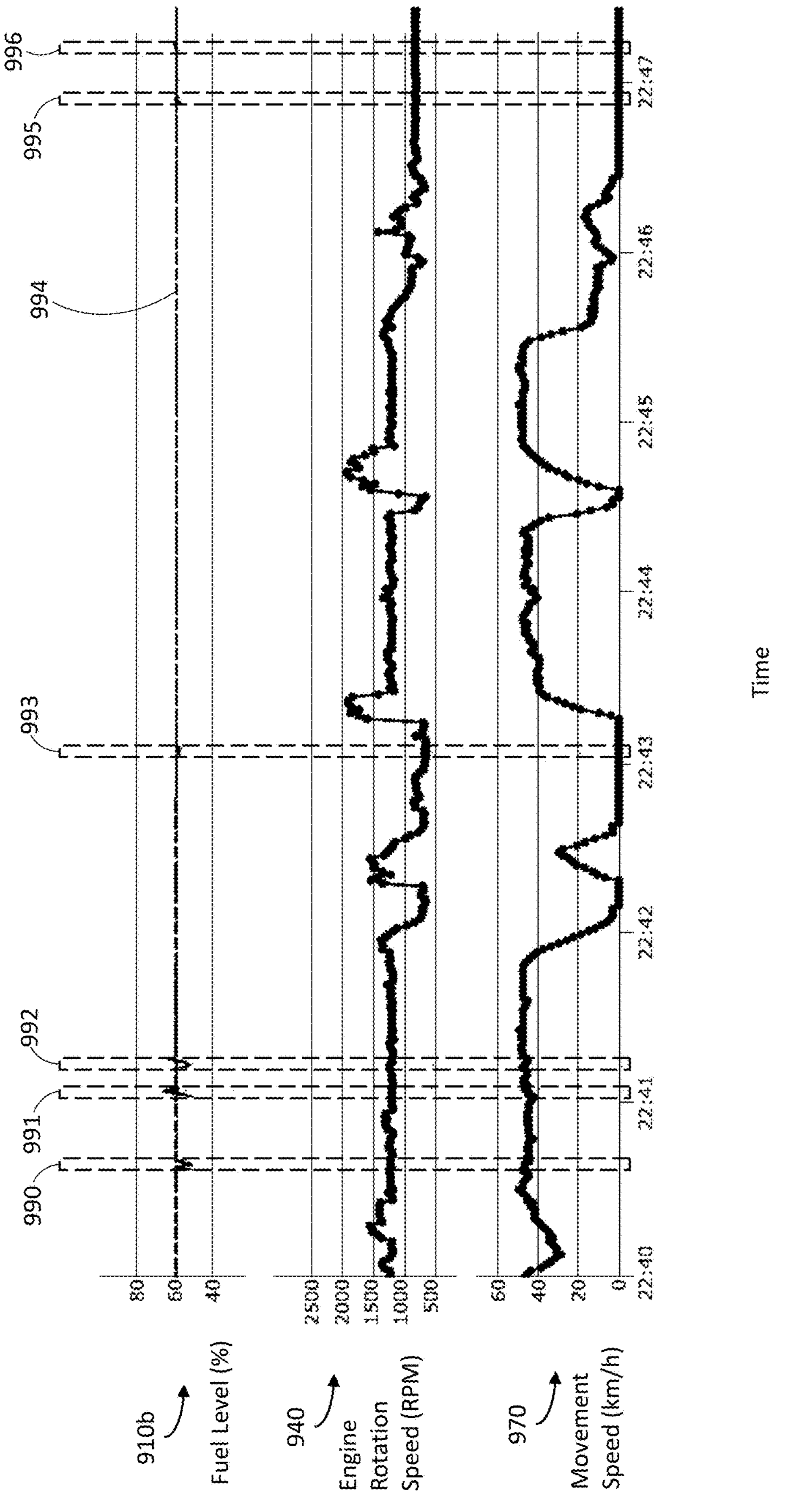

Returning the method 400 in FIG. 4, at 420, a fuel level trend is determined by the at least one processor. For example, data points in the fuel level data subset can be connected via lines which represent fuel level between respective data points. As another example, data points in the fuel level data subset can be averaged to arrive at an average fuel level. As yet another example, a best fit line, curve, or equation (e.g. a polynomial) can be determined using any appropriate statistical technique, which represents fuel level over time. Non-limiting example techniques include least squares regression or ordinary least squares regression. FIGS. 9A and 9B discussed below illustrate an example in this regard.

FIGS. 9A and 9B are plot diagrams illustrating time-synchronized data sets across multiple plots, similar to FIGS. 3 and 8 discussed earlier.

In FIG. 9A, plot 910*a* shows Fuel Level over time, expressed as a percentage. Fuel Level percentage can range from 0% (tank is read by fuel level sensors as empty) to 100% (fuel tank is read by fuel level sensors as full), as discussed earlier.

FIG. 9A also shows plot 940, which indicates Engine Rotation Speed as expressed in RPM. FIG. 9A also shows plot 970, which shows vehicle Movement Speed expressed in km/h. Engine rotation speed and/or vehicle movement speed can be collected as discussed earlier.

FIG. 9A also illustrates several instances 990, 991, 992, 993, 994, and 995 of a moving time window, where operation data (in this example, engine rotation speed data OR movement speed data) is within stability criteria. That is, one of engine RPM or speed in km/h are stable over instances 990, 991, 992, 993, 994, and 995; and as such the fuel level data within these instances of the moving time window can be included in a fuel level data subset in accordance with sub-acts 412 and 416 of method 400.

FIG. 9A also shows a fuel level trend 912 which is determined based on the fuel level data in the fuel level data subset (the fuel level data in instances 990, 991, 992, 993, 994, and 995 of the moving time window, excluding other fuel level data within the extent of plot 910*a* shown). Fuel level trend in the example is determined by any appropriate technique, such as connecting points in the fuel level data subset, averaging the fuel level data in the subset, least squares regression, or ordinary least squares regression, as non-limiting examples. The fuel level trend 912 indicates that fuel level is about 60% for the time period illustrated in FIG. 9A.

FIG. 9B is similar to FIG. 9A, but illustrates a plot 910*b* instead of plot 910*a*. Plot 910*b* is similar to plot 910*a*, except that raw fuel level data outside of instances 990, 991, 992, 993, 994, and 995 of the moving time window is not shown, so as to more clearly illustrate the data in the fuel level data subset and the fuel level trend 912.

FIG. 9B also shows plot 940, which indicates Engine Rotation Speed as expressed in RPM. FIG. 9B also shows plot 970, which shows vehicle Movement Speed expressed in km/h. Engine rotation speed and/or vehicle movement speed can be collected as discussed earlier.

Returning to method 400 in FIG. 4, at 422 at least a portion of the fuel level trend is output. In some implementations, the fuel level trend itself can be output. In other implementations, the fuel level trend can be simplified to a portion thereof as discussed later with reference to optional sub-act 424, so as to reduce data burden in outputting the fuel level trend.

What is meant by at least a portion of the fuel level trend being "output" can vary and be application specific.

In one example, the fuel level data and the operation data can be collected in acts 402 and 404 by a vehicle device positioned at a vehicle. The collected fuel level data and operation data are then transmitted, by a communication interface positioned at the vehicle (e.g. communication interfaces 128 or 226), to another device (such as management device 110, optional device 130, or any other appropriate server). Acts 410 (including sub-acts 412, 416, 418, and optionally 414), 420, optionally 424, and 422 can then be performed remote from the vehicle device (e.g. at the another device, such as by any of processors 114 or 134). Further, at least one non-transitory processor readable storage medium of the another device can store processor-executable instructions, which when executed by the at least one processor of the another device, cause the another device to perform any appropriate acts of method 400.

In another example, acts 402, 404, 410 (including sub-acts 412, 416, 418, and optionally 414), 420, optionally 424, and 422 can be performed by appropriate components at a vehicle device positioned at a vehicle (such as vehicle device 122 or telematics device 204). That is, fuel level data is collected, stable fuel level data is identified and included in a fuel level data subset, and a fuel level data trend is determined, at a vehicle device. In such an example, outputting at least a portion of the fuel level data subset can comprise transmitting, by a communication interface positioned at the vehicle (e.g. communication interfaces 128 or 226), the at least a portion of the fuel level trend to another device or server remote from the vehicle (such as management device 110 or optional device 130). Advantageously, by transmitting the fuel level trend (as opposed to raw fuel level data), transmission bandwidth consumption can be reduced. Further advantageously, generating a simplified fuel level dataset as in act 424 discussed below can further reduce transmission bandwidth consumption.

Optionally, method 400 further comprises act 424 of generating a simplified fuel level dataset. The at least one processor of the vehicle device (e.g. processor 124 or 222) can generate the simplified fuel level dataset by selectively filtering data points of the fuel level trend. In an exemplary implementation, generating the simplified fuel level dataset by selectively filtering data points of the fuel level trend comprises: identifying select data points from the fuel level trend for inclusion in the simplified fuel level dataset based on difference between the select data points and iteratively-defined reference lines through portions of the fuel level trend. The select data points can be compiled as the simplified fuel level dataset, excluding data points which are not identified as select data points. Such an implementation is discussed by way of example below with reference to FIGS. 10A, 10B, 10C, and 10D (though other examples are also possible). In order to perform the process discussed with reference to FIGS. 10A, 10B, 10C and 10D, if the fuel level trend is expressed as an equation or formula, periodic data points corresponding to the fuel level trend can be analyzed (e.g. the fuel level trend equation, at certain time values).

Figure 10A:
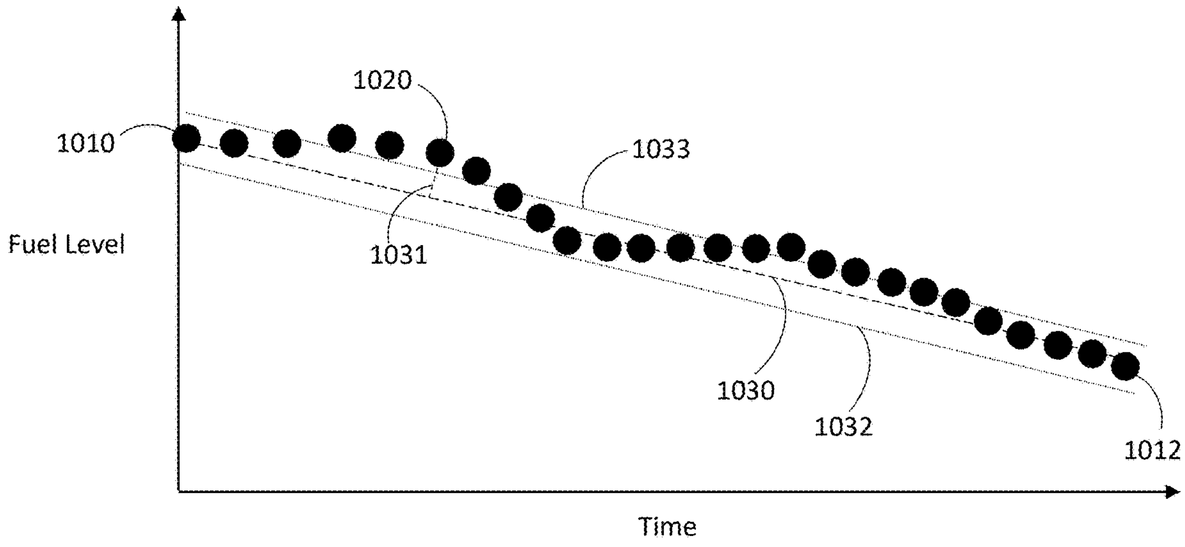
FIGS. 10A, 10B, 10C, and 10D illustrate exemplary fuel level data plots, where a simplified fuel level dataset is determined in accordance with at least one illustrated implementation.

FIG. 10A is an exemplary plot which illustrates an exemplary set of input fuel level trend data. FIGS. 10A, 10B, 10C, and 10D are plots which illustrate an exemplary process for generating a simplified fuel level dataset from the input fuel level trend data shown in FIG. 10A (an example of act 424 in FIG. 4).

FIG. 10A illustrates fuel level data corresponding to a fuel level trend as determined at act 420 of method 400. In the example of FIG. 10A each black circle represents a point of fuel level data corresponding to a portion of the fuel level trend. The fuel level trend in FIGS. 10A-10D is shown using hypothetical data to illustrate the process of simplifying the data. As such the actual fuel level percentage and time are not labelled.

In the example of FIGS. 10A-10D, a "difference" between a given data point and a reference line represents a difference in fuel level represented by the data point and represented by the reference line. In this way, selecting data points from the fuel level trend data for inclusion in the simplified fuel level dataset, based on differences of the data points to iteratively-defined reference lines defined through portions of the fuel level trend data includes selecting data points from the fuel level trend data for inclusion in the simplified fuel level dataset, based on differences in fuel level between fuel levels represented by the data points to iteratively-defined reference lines defined through portions of the fuel level trend data.

Each point of data in FIGS. 10A-10D is not expressly labelled, to reduce clutter. Generally, however, data illustrated as a black circle indicates data which is not (or has not yet been) excluded from the simplified fuel level dataset. Data which has been excluded from the simplified fuel level dataset is illustrated as white circles in FIGS. 10B-10D.

In FIG. 10A, a reference line 1030 is defined between end points 1010 and 1012 of the fuel level trend data. In the example of FIGS. 10A-10D, reference line 1030 is a first reference line of a set of iteratively-defined reference lines as mentioned above. End points 1010 and 1012 can be defined in various ways. In some implementations, end points 1010 and 1012 can be defined as the start and end, respectively, of a trip or journey by the vehicle (e.g. when the vehicle is activated or moved, until the vehicle is deactivated or stops moving). In some implementations, end points 1010 and 1012 can be defined as the start and end, respectively, of a region of data of interest. For example, a user can provide input indicating that the data from point 1010 to point 1012 is of interest, and the generation of simplified fuel level dataset is performed over this region of interest. What is considered a region of "interest" is highly application and situation specific, and could for example refer to a region where simplification of fuel level data is considered likely to be effective (e.g. journeys over long, straight roads). In some implementations, end points 1010 and 1012 can be defined as the earliest and latest times of data points in the fuel level data subset.

In the exemplary implementation, the simplified fuel level dataset is generated by selecting data points from the fuel level trend data, based on differences of the data points to reference lines. In the scenario of FIG. 10A, a minimum difference between respective data points (data points sequentially between end points 1010 and 1012) and reference line 1030 is determined.

Further, a data point of the fuel trend level data is identified, where a minimum difference between the data point and the reference line 1030 is greater than a minimum difference between other data points being compared (sequential points between points 1010 and 1012) and the reference line 1030. That is, a data point of the fuel level trend data between points 1010 and 1012 is identified which is the most different from the reference line 1030. In FIG. 10A, this data point is labelled as point 1020, with the minimum difference between point 1020 and reference line 1030 illustrated by line 1031 (perpendicular to reference line 1030).

Following identification of point 1020, a determination is made as the whether the minimum difference between point 1020 and reference line 1030 exceeds a difference threshold. In practical applications, such a difference threshold could for example be 1% (for fuel level measured on a percentage scale from 0% to 100%), though other difference thresholds are possible as appropriate for a given application. In FIG. 10A, a difference threshold is illustrated around reference line 1030 as threshold lines 1032 and 1033. Point 1020 lies a distance from reference line 1030, outside of said difference threshold. Consequently, point 1020 is selected for inclusion in the simplified fuel level dataset in act 424 of method 400.

Figure 10B:
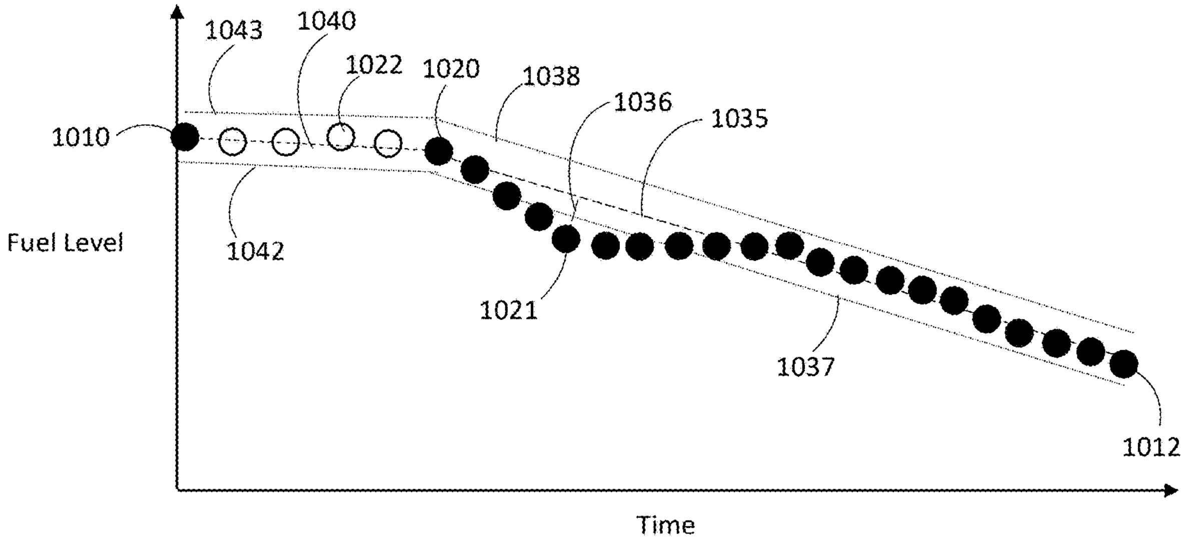

Further, the iteratively-defined reference lines are updated to include reference lines which intersect point 1020, as is shown in FIG. 10B.

FIG. 10B illustrates the fuel level trend data shown in FIG. 10A. In FIG. 10B, a reference line 1035 is defined between point 1020 and end point 1012 of the fuel level trend data. Further in FIG. 10B, a reference line 1040 is defined between end point 1010 and point 1020 of the fuel level trend data. In the example of FIGS. 10A-10D reference lines 1035 and 1040 are second and third reference lines of the set of iteratively-defined reference lines as mentioned above.

As discussed earlier, the simplified fuel level dataset is determined by selecting data points from the fuel level trend data, based on differences of the data points to reference lines. In the scenario of FIG. 10B, for reference line 1035, a minimum difference between respective data points (data points sequentially between point 1020 and 1012) and reference line 1035 is determined. A data point of the fuel level trend data is identified, where a minimum difference between the data point and the reference line 1035 is greater than a minimum difference between other data points being compared (sequential data points between points 1020 and 1012) and the reference line 1035. That is, a data point of the fuel level trend data between points 1020 and 1012 is identified which is the most different from the reference line 1035. In FIG. 10B, this data point is labelled as point 1021, with the minimum difference between point 1021 and reference line 1035 illustrated by line 1036 (perpendicular to reference line 1035).

Following identification of point 1021, a determination is made as to whether the minimum difference between point 1021 and reference line 1035 exceeds a difference threshold. In FIG. 10B, a difference threshold is illustrated around reference line 1035, shown as threshold lines 1037 and

1038. As can be seen in FIG. 10B, point 1021 lies outside of threshold lines 1037 and 1038, and therefore the minimum difference is outside of the difference threshold. Consequently, point 1021 is selected for inclusion in the simplified fuel level dataset.

Further in the scenario of FIG. 10B, for reference line 1040 in FIG. 10B, a minimum difference between respective data points (data points sequentially between end point 1010 and point 1020) and reference line 1040 is determined.

Further, a data point of the fuel level dataset data is identified, where a minimum difference between the data point and the reference line 1040 is greater than a minimum difference between other data points being compared (sequential data points between points 1010 and 1020) and the reference line 1040. That is, a data point of the fuel level data between points 1010 and 1020 is determined which is the most different from the reference line 1040. In FIG. 10B, this data point is labelled as point 1022.

Following determination of point 1022, a determination is made as the whether the minimum difference between point 1022 and reference line 1040 exceeds a difference threshold. In FIG. 10B, a difference threshold is illustrated around reference line 1040, shown as threshold lines 1042 and 1043. As can be seen in FIG. 10B, point 1022 lies within threshold lines 1042 and 1043, and therefore the difference is within than the difference threshold. Consequently, point 1022 is not selected for inclusion in the simplified fuel level dataset.

Further, because point 1022 is the most different point from reference line 1040 between points 1010 and 1020, every other point between points 1010 and 1020 is also within the difference threshold illustrated by threshold lines 1042 and 1043. Consequently, every point between points 1010 and 1020 is not selected for inclusion in the simplified fuel level dataset. This is shown in FIG. 10B with these points being illustrated in white.

Figure 10C:
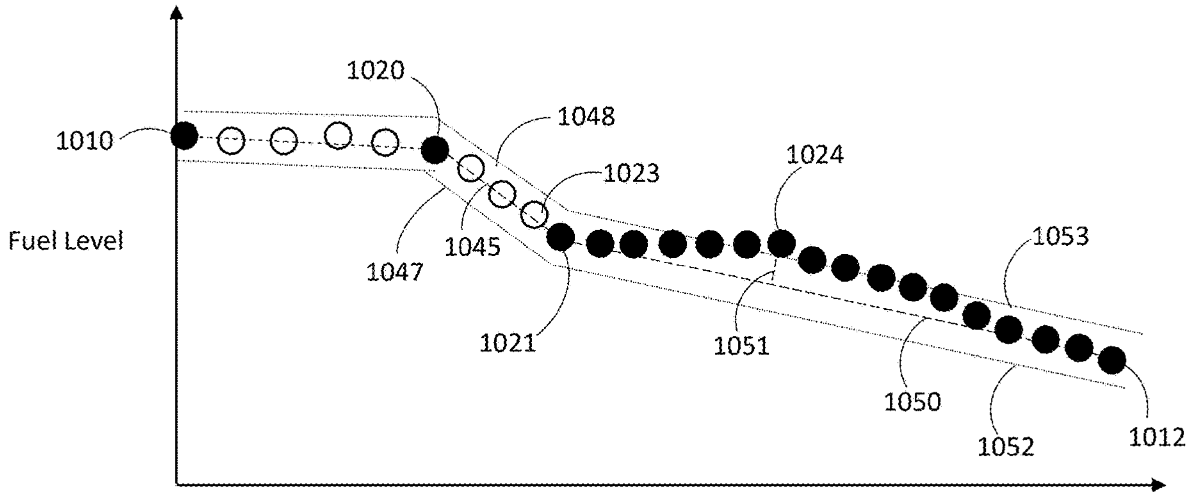

Further, the iteratively-defined reference lines are updated to include reference lines which intersect point 1021, as is shown in FIG. 10C.

FIG. 10C illustrates the fuel level trend data shown in FIG. 10A. In FIG. 10C, a reference line 1045 is defined between 1020 and point 1021 of the fuel level trend data. Further in FIG. 10C, a reference line 1050 is defined between point 1021 and end point 1012 of the fuel level trend data. In the example of FIGS. 10A-10D, reference lines 1045 and 1050 are fourth and fifth reference lines of the set of iteratively-defined reference lines as mentioned above.

As mentioned earlier, the simplified fuel level dataset is generated by selecting data points from the fuel level trend data, based on differences of the data points to reference lines. In the scenario of FIG. 10C, for reference line 1045, a minimum difference between respective data points (data points sequentially between point 1020 and point 1021) and reference line 1045 is determined.

A data point of the fuel level data is identified, where a minimum difference between the data point and the reference line 1045 is greater than a minimum difference between other data points being compared (sequential points between points 1020 and 1021) and the reference line 1045. That is, a data point of the fuel level trend data between points 1020 and 1021 is identified which is the most different from the reference line 1045. In FIG. 10C, this data point is labelled as point 1023.

Following determination of point 1023, a determination is made as the whether the minimum difference between point 1023 and reference line 1045 exceeds a difference threshold. In FIG. 10C, a difference threshold is illustrated around reference line 1045, shown as threshold lines 1047 and 1048. As can be seen in FIG. 10C, point 1023 lies within threshold lines 1047 and 1048, and therefore the difference is within the difference threshold. Consequently, point 1023 is not selected for inclusion in the simplified fuel level dataset. Further, because point 1023 is the most different point from reference line 1045 between points 1020 and 1021, every other point between points 1020 and 1021 is also within the difference threshold illustrated by threshold lines 1047 and 1048. Consequently, every point between points 1020 and 1021 is not selected for inclusion in the simplified fuel level dataset. This is shown in FIG. 10C with these points being illustrated in white.

Further in the scenario of FIG. 10C, for reference line 1050, a minimum difference between respective data points (data points sequentially between points 1021 and end point 1012) and reference line 1050 is determined.

Further, a data point of the fuel level data is identified, where a minimum difference between the data point and the reference line 1050 is greater than a minimum difference between other data points being compared (sequential points between points 1021 and 1012) and the reference line 1050. That is, a data point of the fuel level data between points 1021 and 1012 is identified which is the most different from the reference line 1050. In FIG. 10C, this data point is labelled as point 1024, with a distance from reference line 1050 labelled as line 1051.

Following determination of point 1024, a determination is made as to whether the minimum difference between point 1024 and reference line 1050 exceeds a difference threshold. In FIG. 10C, a difference threshold is illustrated around reference line 1050, shown as threshold lines 1052 and 1053. As can be seen in FIG. 10C, point 1024 lies outside of threshold lines 1052 and 1053, and therefore the difference is greater than the difference threshold. Consequently, point 1024 is selected for inclusion in the simplified fuel level dataset.

Figure 10D:
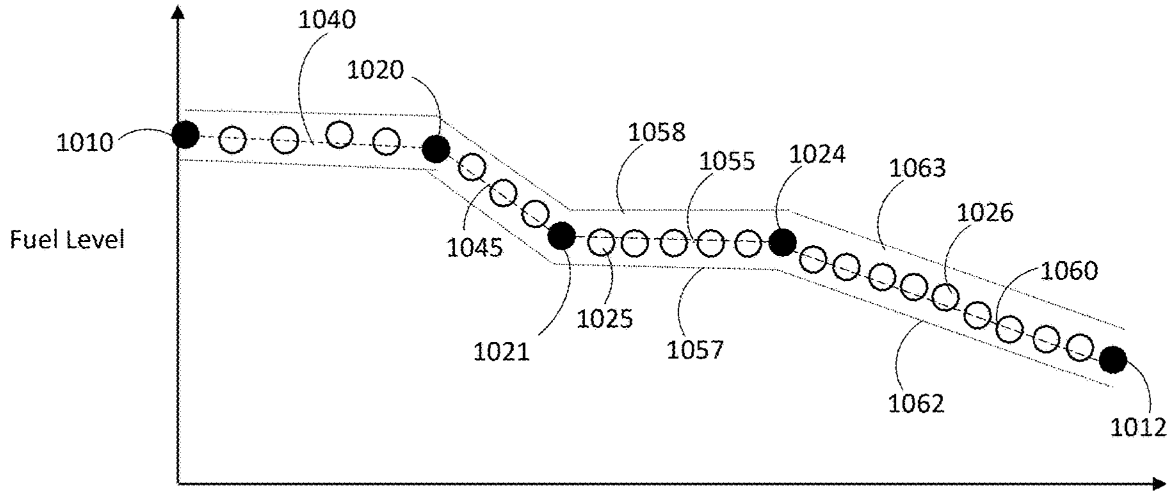

Further, the iteratively-defined reference lines are updated to include reference lines which intersect point 1024, as is shown in FIG. 10D.

FIG. 10D illustrates the fuel level trend data shown in FIG. 10A. In FIG. 10D, a reference line 1055 is defined between point 1021 and point 1024 of the fuel level data. Further in FIG. 10D, a reference line 1060 is defined between point 1024 and end point 1012 of the fuel level trend data. In the example of FIGS. 10A-10D, reference lines 1055 and 1060 are sixth and seventh reference lines of the set of iteratively-defined reference lines as mentioned above.

As mentioned earlier, the simplified fuel level dataset is generated by selecting data points from the fuel level trend data, based on differences of the data points to reference lines. In the scenario of FIG. 10D, for reference line 1055, a minimum difference between respective data points (data points sequentially between points 1021 and 1024) and reference line 1055 is determined.

Further, a data point of the fuel level trend data is identified, where a minimum difference between the data point and the reference line 1055 is greater than a minimum difference between other data points being compared (sequential points between points 1021 and 1024) and the reference line 1055. That is, a data point of the fuel level trend data between points 1021 and 1024 is identified which is the most different from the reference line 1055. In FIG. 10D, this data point is labelled as point 1025.

Following identification of point 1025, a determination is made as the whether the minimum difference between point

1025 and reference line 1055 exceeds a difference threshold. In FIG. 10D, a difference threshold is illustrated around reference line 1055, shown as threshold lines 1057 and 1058. As can be seen in FIG. 10D, point 1025 lies within threshold lines 1057 and 1058, and therefore the difference is within the difference threshold. Consequently, point 1025 is not selected for inclusion in the simplified fuel level dataset. Further, because point 1025 is the most different point from reference line 1055 between points 1021 and 1024, every other point between points 1021 and 1024 is also within the difference threshold illustrated by threshold lines 1057 and 1058. Consequently, every point between points 1021 and 1024 is not selected for inclusion in the simplified fuel level dataset. This is shown in FIG. 10D with these points being illustrated in white.

Further in the scenario of FIG. 10D, for reference line 1060 in FIG. 10D, a data point of the fuel level trend data is identified, where a minimum difference between the data point and the reference line 1060 is greater than a minimum difference between other data points being compared (sequential points between points 1024 and 1012) and the reference line 1060. That is, a data point of the fuel level trend data between points 1024 and 1012 is identified which is the most different from the reference line 1060. In FIG. 10D, this data point is labelled as point 1026.

Following identification of point 1026, a determination is made as to whether the minimum difference between point 1026 and reference line 1060 exceeds a difference threshold. In FIG. 10D, a difference threshold is illustrated around reference line 1060, shown as threshold lines 1062 and 1063. As can be seen in FIG. 10D, point 1026 lies within threshold lines 1062 and 1063, and therefore the difference is within the difference threshold. Consequently, point 1026 is not selected for inclusion in the simplified fuel level dataset. Further, because point 1026 is the most different point from reference line 1060 between points 1024 and 1012, every other point between points 1024 and 1012 is also within the difference threshold illustrated by threshold lines 1062 and 1063. Consequently, every point between points 1024 and 1012 is not selected for inclusion in the simplified fuel level dataset. This is shown in FIG. 10D with these points being illustrated in white.

In FIG. 10D, the fuel level trend data has been reduced to points which indicate end points of respective reference lines. That is, in FIG. 10D, the fuel level trend data has been reduced from 26 data points to 5 data points. Reference lines 1040, 1045, 1055, and 1060 between these 5 data points show a piece-wise fuel level plot of the vehicle which approximates actual fuel level for the vehicle (within the above discussed difference thresholds), while requiring significantly less data points to illustrate. In essence, the selected data points 1010, 1020, 1021, 1024, and 1012 illustrate inflection points, where a fuel level of the vehicle begins to change significantly enough to be of note.

The process of fuel level data simplification discussed with reference to FIGS. 10A-10D is also called "curve logging", and is discussed in significant detail in U.S. Pat. No. 11,022,444, the entirety of which is incorporated by reference herein.

In implementations where the simplified fuel level dataset is generated at 424, act 422 of method 400 comprises outputting the simplified fuel level dataset to the another device. In particular, the "simplified" fuel level dataset includes only a portion of the data points of the fuel level trend, and is thus "a portion of the fuel level trend". In such implementations, outputting the at least a portion of the smoother fuel level dataset to another device comprises outputting the simplified fuel level dataset (as the portion) to the another device.

As mentioned earlier, in some implementations, outputting at least a portion of the simplified fuel level dataset comprises transmitting the at least a portion of the simplified fuel level dataset to a server remote from the vehicle. In particular, acts 402, 404, 410, 412, 414, 416, 420, 422, and 424 can be performed a vehicle device positioned at a vehicle. In act 422, the vehicle device can transmit (e.g. by any of communication interfaces 128 or 226) the simplified fuel level dataset (or a portion thereof) to a central device or server (such as management device 110).

By transmitting the fuel level trend (or the simplified fuel level dataset which is a representation of the fuel level trend), the fuel level trend can be used at a central device for fleet management. For example, by collecting fuel level trends from a fleet of vehicle, the management device 110 (or a user thereof) can determine what vehicles need refueled, what vehicles are ready or suitable for deployment, etcetera.

Figures 11, 12:
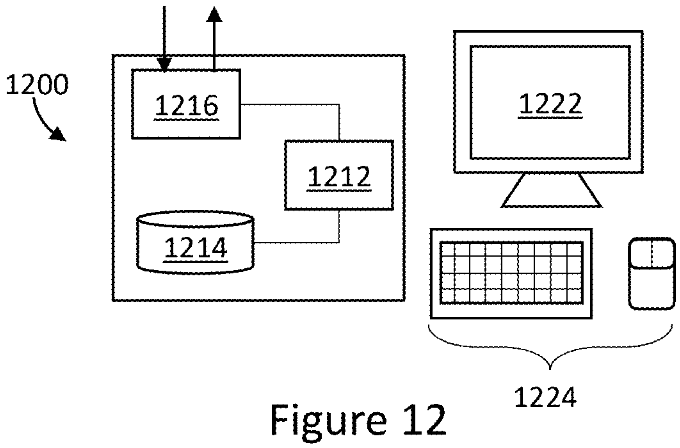
FIG. 11 illustrates an exemplary user interface for presenting fuel level information, in accordance with at least one illustrated implementation.
FIG. 12 is a schematic diagram showing an exemplary device for presenting a user interface.

FIG. 11 illustrates an exemplary user interface 1100, which shows an exemplary output from a management device. For example, user interface 1100 can be presented via a display of management device 110, or via a display of a device communicatively coupled to management device 110 (such as user terminal, or optional device 130). User interface 1100 is shown as including a table with 4 columns 1110, 1120, 1130, and 1140.

In column 1110, a plurality of vehicle identifiers are listed. While three vehicles are illustrated, any appropriate number of vehicles can be listed. Further, any appropriate vehicle identifiers can be used, such as license plate numbers, VINs, vehicle make, vehicle model, vehicle name or nickname, or any other identifier.

In column 1120, a respective fuel level for each vehicle is indicated. The respective fuel levels are based on or pulled from fuel level trends or simplified fuel level datasets as output for a plurality of vehicles in accordance with act 422 of method 400. In the illustrated example, the respective fuel level for each vehicle is indicated as a percentage, but in alternative implementations fuel level can be indicated in any appropriate way. For example, fuel level can be indicated by volume or weight. Such fuel volume or weight could be determined for example by comparing the fuel level percentage to a look up table, for corresponding fuel level volume or weight measurements. Such comparison can be performed by at least one processor of the management device 110 or other device which presents user interface 1100.

In column 1130, information regarding a next trip for each vehicle is presented. In the illustrated example, a distance of the next trip is presented. In other implementations, other information regarding a next trip can be presented, such as expected time of next trip, or expected fuel consumption of next trip. The information regarding the next trip can be accessed from a vehicle schedule or other planning tool. Further, fuel consumption for a next trip can be estimated for example by accessing a historical database containing fuel consumption data for similar trips, or by running a trip simulation to approximate fuel consumption over the trip. Such planning or estimation tools can be stored or utilized at management device 110, at a device presenting the user interface 1100, or at any device in communication with the device which presents user interface 1100.

In column 1140, an indication is presented regarding whether a fuel level of each vehicle is sufficient to a next trip planned for the respective vehicle. In the illustrated example, vehicle XXX-XXX and vehicles ZZZ-ZZZ have sufficient fuel to perform respective next trips. However, vehicle YYY-YYY lacks the necessary or expected amount of fuel to perform a next trip.

FIG. 11 thus illustrates a system or device which can be used for managing vehicles. In the illustrated example, a user of the device can view user interface 1100, and be made aware that vehicle YYY-YYY lacks the necessary or expected amount of fuel to perform a next trip. The user can then take action to address this issue. For example, the user could take steps to refuel vehicle YYY-YYY (e.g. by performing the refueling, or providing an instruction to refuel the vehicle). As another example, the user could reorganize the vehicle schedules such that a different vehicle performs the trip planned for vehicle YYY-YYY. For example, the user could swap the next trips for vehicles XXX-XXX and YYY-YYY (if appropriate, e.g. similar type of vehicle which can serve the similar function). As a result, the next trip to be performed by vehicle YYY-YYY would be much shorter, and achievable with the low fuel level of vehicle YYY-YYY. Further, because vehicle XXX-XXX carries more fuel, vehicle XXX-XXX should be able to perform the next trip that was originally scheduled for vehicle YYY-YYY.

The user interface 1100 of FIG. 11 is merely exemplary, and any appropriate user interface could be implemented as appropriate for a given application. Further, the specific details shown in interface 1100 are also exemplary, and any appropriate details could be added, removed, or changed as appropriate for a given application. In some implementations, information regarding a next planned trip for a vehicle (as shown in column 1130) may not be available or may not be presented. In such cases, column 1140 can instead show whether a fuel level for each vehicle is above a fuel threshold (i.e. an amount of fuel that is generally sufficient for reasonable future use of the vehicle). When a fuel level for a vehicle falls below this fuel threshold, a notification can optionally be presented which informs a user of such.

FIG. 12 is a schematic view of an operator device 1200, which could be used for vehicle management and use in any of the implementations discussed herein, and in particular is useful for presenting information to a user (such as in FIG. 11 discussed above). For example, device 1200 could be used as management device 110 or optional device 130 in FIG. 1, or as a user interface device to provide input to or present output from these devices. Device 1200 as illustrated includes at least one processor 1212, at least one non-transitory processor-readable storage medium 1214, and a communication interface 1216. The non-transitory processor-readable storage medium 1214 can have processor-readable instructions stored thereon which, when executed by the at least one processor 1212 cause the device 1200 to perform appropriate operations (such as presenting output as discussed above with reference to FIG. 11). Communication interface 1216 can be a wired or wireless interface, through which data and inputs can be provided to device 1200, and through which data and outputs can be provided by device 1200.

FIG. 12 also illustrates exemplary input and output devices through which a user or operator can interact with device 1200. In particular, FIG. 12 shows a display 1222, which can display outputs from device 1200. Other output devices could be provided such as speakers, or any other appropriate output device. FIG. 12 also shows a keyboard and mouse 1224, which can be used to provide inputs to the device 1200. Other input devices could also be used, such as a touchscreen, microphone, trackpad, or any other appropriate input device. Although the input and output devices illustrated in FIG. 12 appear in the form of those used with a desktop computer, other forms of devices could also be used, such as portable devices like a laptop, smartphone, PDA, tablet, or any other appropriate device. Further, a device to which a user provides input and receives output can be remote from the device 1200. For example, the device including the at least one processor 1212, the at least one non-transitory processor-readable storage medium 1214, and the communication interface 1216 can be a server, which is remote from a workstation or device with which the user interacts.

FIGS. 13, 14, and 15 illustrate other exemplary user interfaces, which show respective exemplary outputs 1300, 1400, and 1500 from a management device. For example, the user interfaces of FIGS. 13, 14, and 15 can be presented via a display of management device 110, or via a display of a device communicatively coupled to management device 110 (such as user terminal, or optional device 130), such as shown in FIG. 12. In a particular scenario, the user interfaces in FIGS. 13, 14, and 15 are useful for managing a plurality of rental vehicles. A vehicle is rented to a customer with a recorded fuel level, and the customer is expected to refill the vehicle fuel prior to returning the vehicle. The Interfaces of FIGS. 13, 14, and 15 are useful for identifying whether a vehicle has been refilled an appropriate amount. That is, fuel level for a vehicle is stored for a previous time (a time of departure by a customer), and used for comparison later to a fuel level trend for the vehicle when the customer returns the vehicle.

The user interface of FIG. 13 is shown as including an output table 1300 including 4 columns 1310, 1320, 1330, and 1340. Column 1310 shows a vehicle identifier (such as a license plate number, VIN, name, make, model, or any other appropriate identifier). Column 1320 shows a fuel level of the vehicle at a time of departure (a time when the customer took the vehicle). Column 1330 shows a fuel level of the vehicle at a time of return (when the customer brought the vehicle back). Column 1340 illustrates a difference between the departure fuel level in column 1320 and the return fuel level in column 1330. In the example of FIG. 13, the vehicle has been refilled, and there is no difference between the departure fuel level and the return fuel level. A notification to this effect can optionally be presented, shown as notification 1350.

The user interface of FIG. 14 is shown as including an output table 1400 including 4 columns 1410, 1420, 1430, and 1440. Column 1410 shows a vehicle identifier (such as a license plate number, VIN, name, make, model, or any other appropriate identifier). Column 1420 shows a fuel level of the vehicle at a time of departure (a time when the customer took the vehicle). Column 1430 shows a fuel level of the vehicle at a time of return (when the customer brought the vehicle back). Column 1440 illustrates a difference between the departure fuel level in column 1420 and the return fuel level in column 1430. In the example of FIG. 14, the vehicle has NOT been refilled, and there is a difference of 30 liters (50%) between the departure fuel level and the return fuel level. A notification to this effect can optionally be presented, shown as notification 1450. In response to this, a manager for the vehicle can request the customer to refill the vehicle, or can charge the customer for the difference in fuel level.

The user interface of FIG. 15 is shown as including an output table 1500 including 4 columns 1510, 1520, 1530, and 1540. Column 1510 shows a vehicle identifier (such as a license plate number, VIN, name, make, model, or any other appropriate identifier). Column 1520 shows a fuel level of the vehicle at a time of departure (a time when the customer took the vehicle). Column 1530 shows a fuel level of the vehicle at a time of return (when the customer brought the vehicle back). Column 1540 illustrates a difference between the departure fuel level in column 1520 and the return fuel level in column 1530. In the example of FIG. 15, there is a slight difference of 0.6 Liters between the departure fuel level and the return fuel level. This difference could arise from the customer slightly under-filling the vehicle, or from the customer barely using the vehicle, as examples. Regardless, in the illustrated example this slight difference is within a refill threshold, such that the vehicle is still considered "refilled". A notification to this effect can optionally be presented, shown as notification 1550. A refill threshold can be set as appropriate by a vehicle rental agency or manager.

Figure 16:
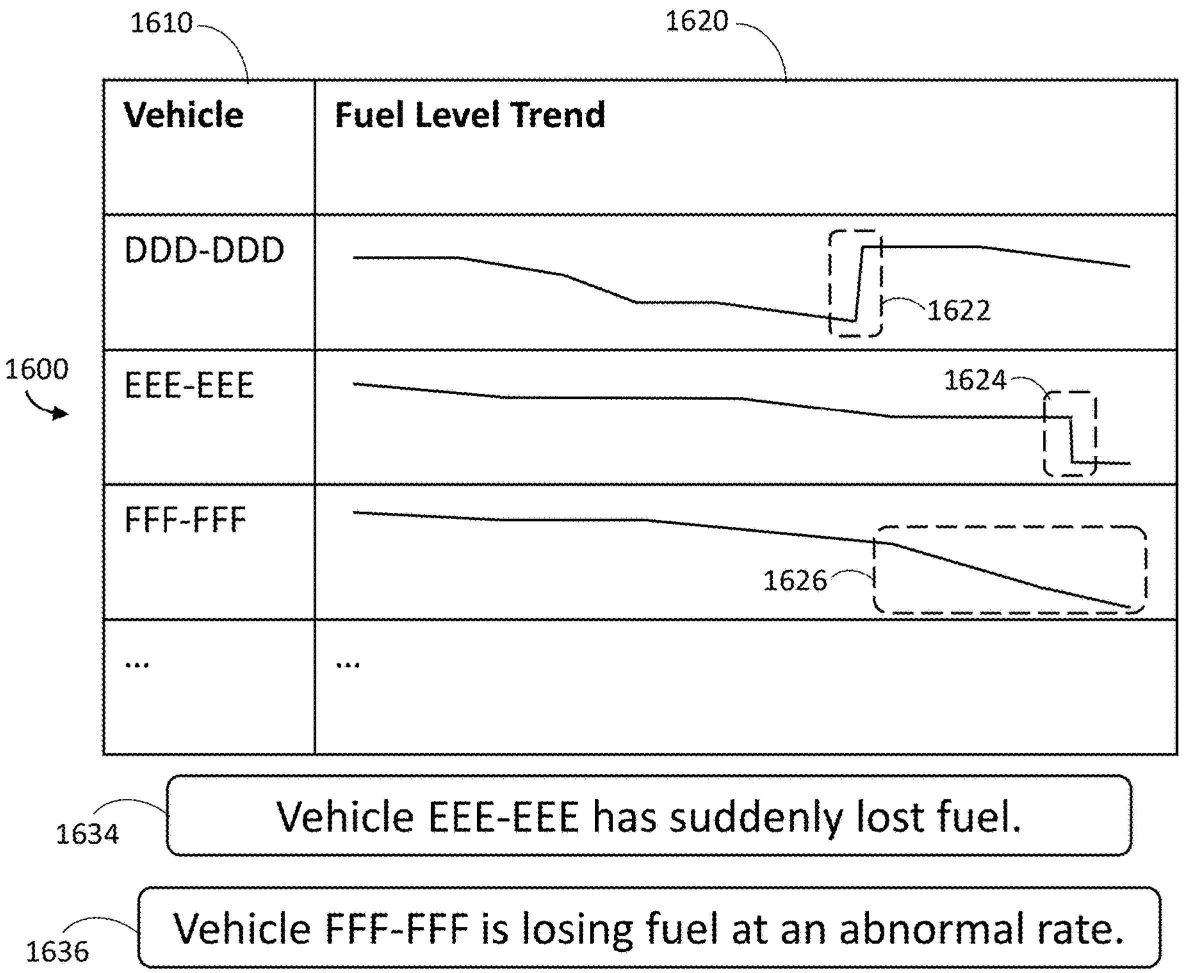

FIG. 16 illustrates another exemplary user interface, which shows an exemplary output table 1600 from a management device. For example, the user interface of FIG. 16 can be presented via a display of management device 110, or via a display of a device communicatively coupled to management device 110 (such as user terminal, or optional device 130), such as shown in FIG. 12. In a particular scenario, the user interface in FIG. 16 is useful for detecting fuel anomalies for a plurality of vehicles.

The user interface of FIG. 16 is shown as including an output table 1600 including 2 columns 1610 and 1620. Column 1610 shows a vehicle identifier (such as a license plate number, VIN, name, make, model, or any other appropriate identifier). Column 1620 shows a fuel trend for the vehicle over time. The fuel trend for each vehicle illustrates sudden changes in fuel level, or changes in fuel level where a rate of change of fuel level exceeds a change rate threshold.

For vehicle DDD-DDD, an event 1622 is highlighted where fuel level suddenly increases. Such an event corresponds to refilling the fuel tank of vehicle DDD-DDD. Optionally, a notification could be presented indicating this refilling event. However, since a refilling event is normal and is not typically indicative of problems, such a notification is not always necessary (and is not shown in FIG. 16).

For vehicle EEE-EEE, an event 1624 is highlighted where fuel level suddenly decreases. Such a sudden decrease in fuel level can correspond to a siphoning event (e.g. where fuel is stolen from vehicle EEE-EEE). Such an event is problematic, and may trigger presentation of a notification of the event, shown as notification 1634. In response to the fuel level trend displayed in column 1620 for vehicle EEE-EEE or notification 1634, a user (e.g. fleet operator) may take action such as obtaining dash-cam or security camera footage (if available) for a location of the vehicle at the time of event 1624, to attempt to apprehend the fuel thief.

For vehicle FFF-FFF, an event 1626 is highlighted where fuel level decreases at an abnormally high rate, though not as high as for a sudden fuel theft event. Such a fast decrease in fuel level can correspond to leak, such as in the fuel tank of the vehicle or in fluid hoses of the vehicle. Such an event is problematic and harmful to the environment, and may trigger presentation of a notification of the event, shown as notification 1636. In response to the fuel level trend displayed in column 1620 for vehicle FFF-FFF or notification 1636, a user (e.g. fleet operator) may take action such as directing the vehicle to inspection and/or maintenance.

Several notifications are discussed in the exemplary user interfaces of FIGS. 11, 13, 14, 15, and 16. Such notifications can take any appropriate form, including a visual or text box presented via a display, and audio alert, an email to a pertinent email address or email distribution list, a message to another device or party, or any other appropriate communication method.

Figure 17:
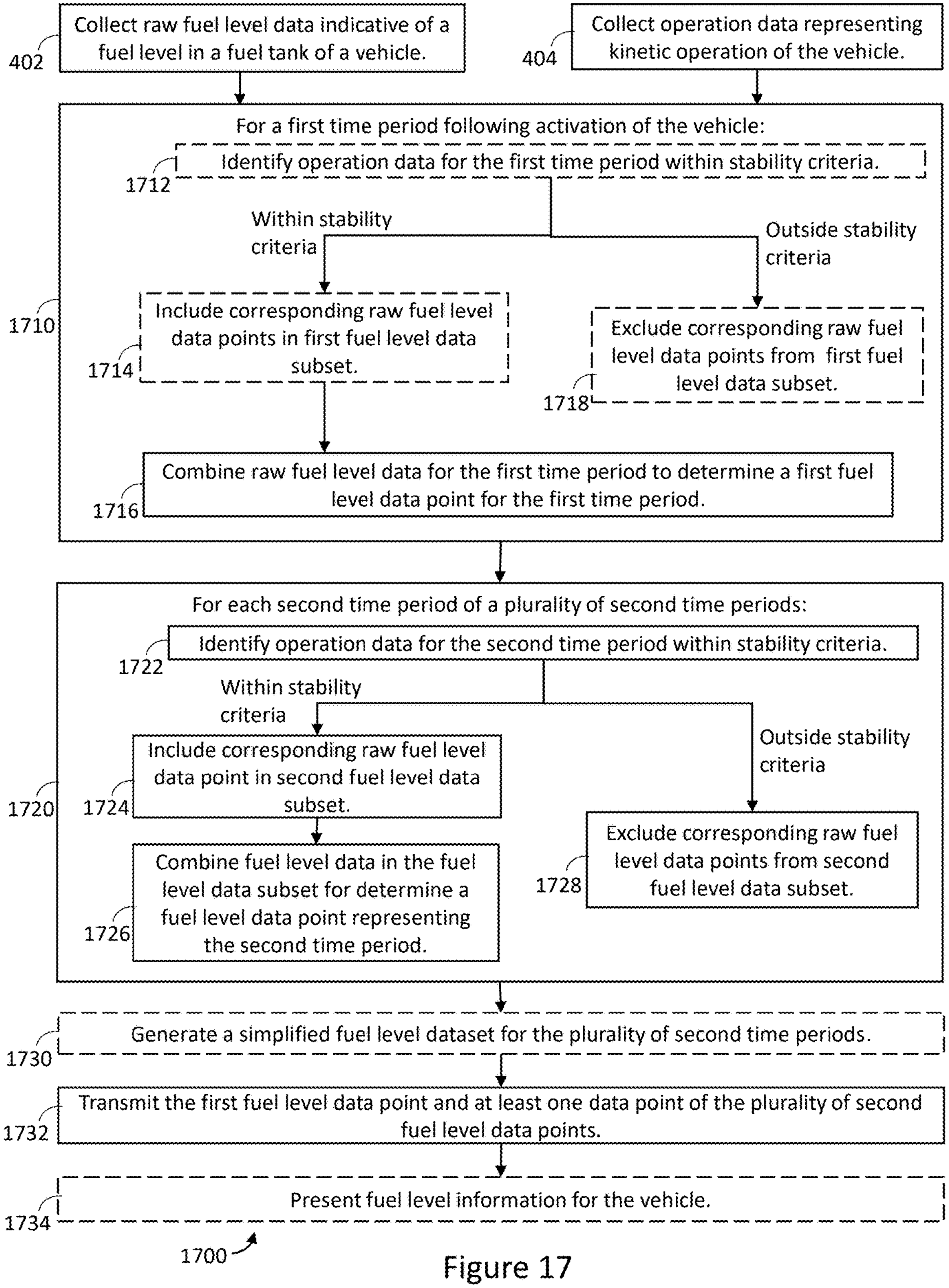
FIG. 17 is a flowchart diagram which illustrates an exemplary method for determining fuel level.

FIG. 17 is a flowchart diagram which illustrates an exemplary method 1700 for determining fuel level of a vehicle. Method 1700 as illustrated includes acts 402, 404, 1710 (including acts 1712, 1714, 1716, and 1718), 1720 (including acts 1722, 1724, 1726, and 1728), 1730, 1732, and 1734. One skilled in the art will appreciate that additional acts could be added, acts could be removed, or acts could be reordered as appropriate for a given application. For example, acts 1712, 1714, 1718, 1730 and 1734 are shown in dashed lines, to emphasize that these acts are optional or can be outside the scope of method 1700. With reference to the example illustrated in FIG. 1, acts can be performed by appropriate components of management device 110, vehicle devices 122, or optional device 130. For example, acts of identification, determination, generation, or general data manipulation can be performed by at least one appropriate processor (e.g. processors 114, 124, 134, 222, or 294). Further, any of the at least one non-transitory processor-readable storage mediums 116, 126, or 136 could have instructions stored thereon, which when executed by a respective at least one processor (processors 114, 124, 134, 222, or 294) cause the respective management device 110, vehicle device 122, or optional device 130 to perform a given act of method 1700. An act being performed by at least one processor 124 refers to the act being performed by any of processors **124*a*, 124*b*, 124*c*, or 124*d*. An act being performed by at least one non-transitory processor-readable storage medium 126 refers to the act being performed by any of non-transitory processor-readable storage mediums 126*a*, 126*b*, 126*c*, or 126*d*. An act being performed by communication interface 128 refers to the act being performed by any of communication interfaces 128*a*, 128*b*, 128*c*, or 128*d*. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122*a*, 122*b*, 122*c*, or 122*d* (or any other similar vehicle device). Generally speaking, in the context of method 1700 acts of identification and determination are performed by at least one processor (e.g. any of processors 114, 124, 134, 222, or 294**). Thus, reference to an act of identifying or determining being performed by a particular device generally refers to the act being performed by at least one processor of the device.

Method 1700 in FIG. 17 is similar in at least some respects to method 400 in FIG. 4. As such, aspects of the description of method 400 are applicable to method 1700 unless context requires otherwise. For example, acts 402 and 404 in method 1700 are similar to acts 402 and 404 in method 400, such that the earlier description of acts 402 and 404 with reference to method 400 is applicable to method 1700, and is not repeated for brevity. To summarize, at 402 raw fuel level data is collected, the raw fuel level data indicative of a fuel level in a fuel tank of a vehicle; at 404 operation data is collected, the operation data representing kinetic operation of the vehicle.

At 1710, an initial fuel level for a vehicle is determined (e.g. by at least one processor 124 of a vehicle device 122 at a vehicle 120) for a first duration following activation of the vehicle. The first duration can be a relatively short duration (e.g. 1 minute), so as to produce a prompt indication of fuel level of the vehicle shortly after activation. This is useful for example in vehicle rental or vehicle share applications, where it is desirable to ascertain an initial fuel level of the vehicle when a user first uses the vehicle. The group of acts 1710 includes at least act 1716, and optionally includes acts 1712, 1714, and 1718 as shown in FIG. 17.

At 1716, raw fuel level data for the first time period is combined to determine a first fuel level data point for the first time period. The first fuel level data point is indicative of an initial fuel level of the vehicle at or around the time of activation of the vehicle.

In some implementations, combining the raw fuel level data for the first time period is based on every data point of raw fuel level data collected for the first time period (i.e. acts 1712, 1714, and 1718 are not included in the method). In other implementations, raw fuel level data is selectively filtered to produce a first fuel level data subset on which the combination is based in act 1716 (i.e. acts 1712, 1714, and 1718 are included in the method).

At 1712, operation data in the first time period is identified where the operation data is within or meets stability criteria. Stability criteria are described earlier with reference to method 400, and this description is fully applicable to method 1700 (and not repeated for brevity). In an exemplary implementation, the stability criteria includes a threshold magnitude of acceleration for the vehicle, where operation of the vehicle is considered sufficiently stable if acceleration is within the threshold acceleration (e.g. less than or equal to 2.5 $m/s^2$). One skilled in the art will appreciate that other values for acceleration threshold could also be implemented, and that other stability criteria (such as any of those discussed earlier) could be implemented instead of or in addition to threshold acceleration. For example, the stability criteria applied in the context of method 1700 (in either or both of acts 1712 and 1722 discussed later) can include a threshold in movement speed of the vehicle, a threshold rotation speed for an engine of the vehicle, a coefficient of variation of the rotation speed of the engine of the vehicle, or any other appropriate stability criteria.

Further, a combination of stability criteria may be implemented (in either or both of acts 1712 and 1722 discussed later), where two or more stability criteria are evaluated for operation data to be considered sufficiently stable. For example, the stability criteria may comprise a threshold in movement speed of the vehicle and a threshold magnitude of acceleration for the vehicle, and identifying whether each point of operation data is within the stability criteria may comprise identifying whether each point of operation data is within the threshold in movement speed of the vehicle and the threshold magnitude of acceleration of the vehicle. As another example, the stability criteria may comprise a threshold in movement speed of the vehicle and a threshold rotation speed of an engine of the vehicle, and identifying whether each point of operation data is within the stability criteria may comprise identifying whether each point of operation data is within the threshold in movement speed of the vehicle and the threshold rotation speed of the engine of the vehicle. Further, in some examples where a combination of stability criteria are implemented, the operation data may be identified as sufficiently stable where one of the stability criteria is satisfied, instead of requiring all stability criteria to be satisfied. Other combinations of stability criteria are also possible.

included in a first fuel level data subset, as in act 1714. Where operation data is outside of the stability criteria, corresponding raw fuel level data points are excluded from the first fuel level data subset as in act 1718. In this context, “corresponding” raw fuel level data refers to a point or plurality of points of fuel level data which represent approximately a same time as the operation data for which stability criteria are being assessed. This does not require that a point of operation data and a point of raw fuel level data be captured at exactly the same moment to be considered as “corresponding”, but rather that they are close enough in time such that the point of operation data accurately represents stability of the vehicle at the time represented by the corresponding point of fuel level data. For example, even if both the operation data and the raw fuel level data are collected at an equal frequency (e.g. 1 Hz), they may not be temporally aligned (e.g. the operation data and the raw fuel level data may be at least a partial second apart). In such an example, a point of operation data can be considered as “corresponding” to a point of raw fuel level data which is closest in time to the point of operation data. As another example, the operation data and the raw fuel level data may be collected at differing frequencies. In such a case, a point of operation data can be considered as “corresponding” to a point of raw fuel level data which is closest in time to the point of operation data. In this sense, depending on data collection frequencies, certain points of raw fuel level data or operation data may not be evaluated in acts 1712, 1714, and 1718 because there may not be a “corresponding” point of raw fuel level data or operation data.

Combining the raw fuel level data in act 1716 (whether that be all of the raw fuel level data for the first time period, or a first fuel level data subset generated in accordance with 1714) can be performed in accordance with any appropriate technique. In one example, the raw fuel level data is averaged, such that the first fuel level data point is an average of the raw fuel level data for the first time period.

At 1720, fuel level for the vehicle is determined for a plurality of second time periods (e.g. by at least one processor 124 of a vehicle device 122 at a vehicle 120). That is, after determining the initial fuel level at 1710, fuel level can be determined on a periodic basis at 1720 (the second plurality of periods). The plurality of second time periods can be after and/or partially overlapping with the first time period. Each second time period can be a relatively long duration (when compared to the first period), so as to balance regularity of fuel level determination with resource cost (e.g. processing burden for determining fuel level, and bandwidth burden for transmitting determined fuel level). In one exemplary implementation, the first time period is 1 minute, and the plurality of second time periods are 3 minutes each. Where activation of the vehicle occurs at a time t=0, the first time period occurs between t=0 and t=1 minute. In an example where the plurality of second time periods partially overlap with the first time period, second time periods occur between t=0 and t=3 minutes, between t=3 and t=6 minutes, between t=6 and t=9 minutes, between t=9 and t=12 minutes, and so on. In an example where the plurality of second time periods is non-overlapping with the first time period, second time periods occur between t=1 and t=4 minutes, between t=4 and t=7 minutes, between t=7 and t=10 minutes, between t=10 and t=13 minutes, and so on. The discussed lengths of first time periods and second time periods, and the overlapping/non-overlapping implementations, are merely exemplary: one skilled in the art could implement time periods of any appropriate length with any appropriate degree of overlap.

Periodically determining fuel level is useful for example in identifying excessive fuel consumption (e.g. due to fuel leakage or non-fuel-efficient driving habits). The group of acts 1720 includes acts 1722, 1724, 1726, and 1728 as shown in FIG. 17. The group of acts within 1720 (acts 1722, 1724, 1726, and 1728) are described in the context of a single second time period; acts 1722, 1724, 1726, and 1728 can be repeated as necessary for each second time period in the plurality of time periods.

At 1722, operation data in the second time period is identified where the operation data is within or meets stability criteria. Stability criteria are described earlier with reference to method 400, and this description is fully applicable to method 1700 (and not repeated for brevity). In an exemplary implementation (similar to as discussed above regarding act 1712), the stability criteria includes a threshold acceleration for the vehicle, where operation of the vehicle is considered sufficiently stable if acceleration is within the threshold acceleration (e.g. less than or equal to 2.5 $m/s^2$). One skilled in the art will appreciate that other values for acceleration threshold could also be implemented, and that other stability criteria (such as any of those discussed earlier) could be implemented instead of or in addition to threshold acceleration. One skilled in the art will also appreciate that the stability criteria used in act 1722 may or may not be equal to the stability criteria used in act 1712. In some implementations, the stability criteria used in act 1712 may be less stringent than the stability criteria used in act 1722. This is because the first time period is shorter than each second time period, and thus it may be acceptable to use less accurate fuel level data in order to use a larger number of data points. As one example, act 1722 could use an acceleration threshold of 2.5 $m/s^2$, and act 1712 could use an acceleration threshold of 3.0 $m/s^2$. As another example, act 1712 could use only an acceleration threshold, and act 1722 could use an acceleration threshold and a movement speed threshold (or any other combination of stability criteria).

Where operation is within the stability criteria, corresponding raw fuel level data is included in a second fuel level data subset (for the respective second time period), as in act 1724. Where operation data is outside of the stability criteria, corresponding raw fuel level data points are excluded from the second fuel level data subset as in act 1728. As discussed earlier with reference to group of acts 1710 (and not repeated for brevity), "corresponding" raw fuel level data refers to a point or plurality of points of fuel level data which represent approximately a same time as the operation data for which stability criteria are being assessed.

At 1726, raw fuel level data for the respective second time period is combined to determine a second fuel level data point for the respective second time period. The second fuel level data point is indicative of an initial fuel level of the vehicle at or around the second time period. Combining the raw fuel level data in act 1726 can be performed in accordance with any appropriate technique. In one example, the raw fuel level data is averaged, such that the respective second fuel level data point is an average of the raw fuel level data for the respective second time period.

At 1730, the at least one processor optionally generates a simplified fuel level dataset for the plurality of second time periods. In particular, the simplified fuel level dataset for the plurality of second time periods can be generated by selectively filtering the respective second fuel level data points determined at 1726. This can comprise identifying select data points from the second fuel level data points determined at 1726 for inclusion in the simplified fuel level dataset based on difference between the select data points and iteratively-defined reference lines through portions of the second fuel level data points. The select data points can be compiled as the simplified fuel level dataset, excluding data points which are not identified as select data points. Such an implementation is discussed by way of example above with reference to FIGS. 10A, 10B, 10C, and 10D (though other examples are also possible), and is not repeated here for brevity.

At 1732, the first fuel level data point and at least one data point of the plurality of second fuel level data points are transmitted (e.g. by at least one communication module of the device at the vehicle). In implementations where a simplified fuel level dataset is not generated at 1730, act 1732 comprises transmitting all of the data points determined at 1726 for each of the second time periods. In implementations where a simplified fuel level dataset is generated at 1730, act 1732 comprises transmitting the simplified fuel level dataset. In some implementations, at least one communication interface of a server remote from the vehicle (e.g. communication interface 118 of management device 110 in FIG. 1) receives the transmitted first fuel level data point and the at least one data point of the plurality of second fuel level data points. In some implementations, at least one communication interface of another device remote from the vehicle (e.g. communication interface 138 of other device 130 in FIG. 1, or communication interface 1216 of operator device 1200 in FIG. 12) receives the transmitted first fuel level data point and at least one data point of the plurality of second fuel level data points (either directly from the vehicle device, or indirectly from a server such as management device 110).

At 1734, fuel level information for the vehicle is presented via a presentation device which receives the fuel level data transmitted at 1732 (the described server or other device, such as management device 110, optional device 130, or operator device 1200). The presented fuel level information is based on the fuel level data transmitted at 1732, and is presented by any appropriate user interface (e.g. display 1222 in FIG. 12). For example, a current fuel level of the vehicle can be presented, by presenting a data point for fuel level of the vehicle which is most recently received (for example shown in FIG. 11 discussed earlier). As another example, a fuel level for at least one particular time of importance for the vehicle (e.g. departure time and return time for a rental) can be identified and presented (e.g. as shown in FIGS. 13, 14, and 15 discussed earlier).

As another example, in some implementations a fuel level trend over time can be determined based on fuel level data points received (e.g. at least one processor of the presentation device can connect fuel level data points, and/or fit a line or curve to the fuel level data points). The fuel trend can be monitored by at least one processor of the device which presents the fuel level information, or a server where the transmitted fuel level data is processed (e.g. any of management device 110, other device 130, or operator device 1200) to identify key events. For example, the at least one processor can determine a rate of change of a fuel level of the vehicle over time based on the at least one data point of the respective second fuel level data points for the plurality of second time periods (and optionally further based on the first fuel level data point for the first time period, and/or on a fuel level of the vehicle as stored for a previous time which precedes the first time period). The at least one processor can monitor the rate of change in fuel level over time against a rate of change threshold, and present a notification when the rate of change of fuel level exceeds the change rate threshold. As example use cases, a sudden increase in fuel level can be identified as corresponding to refilling of the fuel tank; or a sudden or excessive loss of fuel can be identified as an abnormality, which in turn can be indicative of fuel theft or a leak.

As yet another example, fuel level can be monitored, and when fuel level for the vehicle falls below a fuel level threshold, a notification can be presented to an operator (e.g. via display 1222) indicating that fuel level has fallen below the fuel level threshold. As yet another example, an indication of fuel level for the vehicle as represented by the at least one data point of the plurality of second fuel level data points for the plurality of time periods, as compared to a fuel level of the vehicle as stored for a previous time which precedes the first time period. That is, a present fuel level of the vehicle as compared to initial fuel level of the vehicle prior to activating the vehicle can be presented, which is indicative of a fuel consumption of a current trip for the vehicle (or consumption for a plurality of trips, if the "previous time" precedes the plurality of trips. For example, an initial fuel level for a vehicle prior to a rental can be stored as a fuel level for the "previous time", and a fuel level of the vehicle as indicated in a second fuel level data point when the rental period is over can be presented in comparison to the initial fuel level. In this way, difference in fuel level for when the vehicle was rented to when the vehicle is returned can be presented.

Presentation of fuel level as discussed earlier with reference to FIGS. 11-16 is also applicable to fuel level determined in the method 1700 in FIG. 17, and is not repeated in detail for brevity.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processor can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:

1. A system comprising:

at least one data collection device positioned at a vehicle;

a first at least one first communication interface positioned at the vehicle;

a first at least one processor positioned at the vehicle;

a first at least one non-transitory processor-readable storage medium positioned at the vehicle;

a first at least one non-transitory processor-readable storage medium positioned at the vehicle;

a remote device separate from the vehicle, the remote device comprising a second at least one processor, a second at least one non-transitory processor-readable storage medium, and a second at least one communication interface; and a user interface;

wherein the first at least one non-transitory processor-readable storage medium stores first processor-executable instructions which, when executed by the first at least one processor cause the system to:

collect, by the at least one data collection device, operation data representing kinetic operation of the vehicle;

collect, by the at least one data collection device, raw fuel level data indicative of a fuel level in a fuel tank of the vehicle as measured by at least one fuel level sensor at the vehicle;

for a first time period beginning upon activation of the vehicle:

combine, by the first at least one processor at the vehicle, the raw fuel level data corresponding to the first time period to determine a first fuel level data point for the first time period representing an initial fuel level of the vehicle; and transmit, by the first at least one communication interface, the first fuel level data point for storage at the remote device;

after the first time period, determine, by the first at least one processor, a plurality of second fuel level data points for a plurality of second time periods, each second fuel level data point corresponding to a respective second time period of the plurality of second time periods, comprising for each second time period of the plurality of second time periods:

identifying, by the first at least one processor for each data point of operation data in the second time period, whether the data point is within stability criteria, the stability criteria indicative of operation of the vehicle being stable when the data point is within the stability criteria;

for each data point of operation data in the second time period which is within the stability criteria, including a corresponding data point of the raw fuel level data in a fuel level data subset;

for each data point of operation data in the second time period which is outside the stability criteria, excluding a corresponding data point of the raw fuel level data from the fuel level data subset; and combining, by the first at least one processor, the fuel level data in the fuel level data subset to determine a respective second fuel level data point for the second time period; and transmit, by the first at least one communication interface, at least one data point of the plurality of second fuel level data points for the plurality of second time periods;

wherein the second at least one non-transitory processor-readable storage medium stores second processor-executable instructions which, when executed by the second at least one processor cause the system to:

receive, by the second at least one communication interface, the first fuel level data point and the at least one data point of the plurality of second fuel level data points;

determine, by the second at least one processor, a fuel difference between the initial fuel level indicated in the first fuel level data point and a final fuel level indicated in a most recent data point of the at least one data point of the plurality of second fuel level data points;

determine whether the fuel difference is within a fuel difference threshold, the fuel difference threshold indicative of an acceptable discrepancy between initial fuel level and final fuel level;

if the fuel difference is within the fuel difference threshold, output, by the user interface, an indication that fuel adjustment is not needed; and if the difference exceeds the difference threshold, output, by the user interface, an indication that fuel adjustment is needed.

2. The system of claim 1, wherein:

the operation data comprises movement speed data representing a movement speed of the vehicle; and the stability criteria comprise a threshold in the movement speed of the vehicle, where the operation data is within the stability criteria when the movement speed of the vehicle is within the threshold, and the operation data is outside of the stability criteria when the movement speed of the vehicle exceeds the threshold.

3. The system of claim 1, wherein:

the operation data comprises vehicle engine data representing a rotation speed of an engine of the vehicle; and the stability criteria comprises a threshold in the rotation speed of the engine of the vehicle, where the operation data is within the stability criteria when the rotation speed of the engine of the vehicle is within the threshold, and the operation data is outside of the stability criteria when the rotation speed of the engine of the vehicle exceeds the threshold.

4. The system of claim 3, wherein the stability criteria comprises a co-efficient of variation of the rotation speed of the engine of the vehicle, where the operation data is within the stability criteria when the rotation speed of the engine of the vehicle is within the threshold, and the operation data is outside of the stability criteria when the rotation speed of the engine of the vehicle exceeds the threshold.

5. The system of claim 1, wherein:

the operation data comprises acceleration data representing acceleration of the vehicle; and the stability criteria comprises a threshold magnitude of the acceleration of the vehicle, where the operation data is within the stability criteria when the acceleration of the vehicle is within the threshold, and the operation data is outside of the stability criteria when the acceleration of the vehicle exceeds the threshold.

6. The system of claim 1, wherein:

the operation data comprises: movement speed data representing a movement speed of the vehicle, and acceleration data representing acceleration of the vehicle;

the stability criteria comprises a threshold in movement speed of the vehicle and a threshold magnitude of acceleration of the vehicle; and the first processor executable instructions which cause the first at least one processor to identify whether each point of operation data is within the stability criteria cause the at least one processor to identify whether each point of operation data is within the threshold in movement speed of the vehicle and the threshold magnitude of acceleration of the vehicle.

7. The system of claim 1, wherein:

the operation data comprises: movement speed data representing a movement speed of the vehicle, and vehicle engine data representing a rotation speed of an engine of the vehicle;

the stability criteria comprises a threshold in movement speed of the vehicle and a threshold in rotation speed of the engine of the vehicle; and the first processor-executable instruction which cause the first at least one processor to identify whether each point of operation data is within the stability criteria cause the at least one processor to identify whether each point of operation data is within either of the threshold in movement speed of the vehicle or the threshold in rotation speed of the engine of the vehicle.

8. The system of claim 1, wherein the first processor-executable instructions which cause the first at least one processor to combine the raw fuel level data corresponding to the first time period cause the first at least one processor to determine an average fuel level for the first time period by averaging data points in the raw fuel level data for the first time period.

9. The system of claim 1, wherein the first processor-executable instructions which cause the first at least one processor to combine the fuel level data in the fuel level data subset cause the first at least one processor to determine an average fuel level for the respective second time period by averaging data points in the fuel level data subset for the respective second time period.

10. The system of claim 1, wherein:

the first processor-executable instructions further cause the first at least one processor to generate a simplified fuel level dataset for the plurality of second time periods by selectively filtering the plurality of second fuel level data points for the plurality of second time periods; and the first processor-executable instructions which cause the first at least one first communication interface to transmit the at least one data point of the plurality of second fuel level data points for the plurality of second time periods cause the first at least one communication interface to transmit the simplified fuel level dataset for the plurality of second time periods.

11. The system of claim 10, wherein the first processor-executable instructions which cause the first at least one processor to generate the simplified fuel level dataset for the plurality of second time periods by selectively filtering the plurality of second fuel level data points for the plurality of second time periods cause the first at least one processor to:

identify select data points from the plurality of second fuel level data points for inclusion in the simplified fuel level dataset, based on differences between the select data points and iteratively-defined reference lines through portions of the fuel level trend; and compile the select data points as the simplified fuel level dataset, excluding data points which are not identified as select data points.

12. The system of claim 1, where the second processor-executable instructions further cause the remote device to output an indication of the volume of fuel corresponding to the fuel difference.

13. The system of claim 1, further comprising at least one fuel level sensor positioned at the vehicle, wherein:

the first processor-executable instructions further cause the at least one fuel level sensor to capture the raw fuel level data; and the first processor-executable instructions which cause the system to collect, by the at least one data collection device, the raw fuel level data cause the at least one data collection device to receive the raw fuel level data from the at least one fuel level sensor.

14. The system of claim 1, wherein the at least one data collection device includes at least one fuel level sensor, wherein the first processor-executable instructions which cause the system to collect, by the at least one data collection device, the raw fuel level data cause the at least one fuel level sensor to capture the raw fuel level data.

15. A method comprising:

collecting, by at least one data collection device positioned at a vehicle, operation data representing kinetic operation of the vehicle;

collecting, by the at least one data collection device, raw fuel level data indicative of a fuel level in a fuel tank of the vehicle as measured by at least one fuel level sensor at the vehicle;

for a first time period beginning upon activation of the vehicle:

combining, by a first at least one processor at the vehicle, the raw fuel level data corresponding to the first time period to determine a first fuel level data point for the first time period representing an initial fuel level of the vehicle; and transmitting, by a first at least one communication interface at the vehicle, the first fuel level data point for storage at a remote device separate from the vehicle;

after the first time period, determining, by the first at least one processor, a plurality of second fuel level data points for a plurality of second time periods, each second fuel level data point corresponding to a respective second time period of the plurality of second time periods, comprising for each second time period of the plurality of second time periods:

identifying, by the first at least one processor, for each data point of operation data in the second time period, whether the data point is within stability criteria, the stability criteria indicative of operation of the vehicle being stable when the data point is within the stability criteria;

for each data point of operation data in the second time period which is within the stability criteria, including a corresponding data point of the raw fuel level data in a fuel level data subset;

for each data point of operation data in the second time period which is outside the stability criteria, excluding a corresponding data point of the raw fuel level data from the fuel level data subset; and combining, by the first at least one processor, the fuel level data in the fuel level data subset to determine a respective second fuel level data point for the second time period; and transmitting, by the first at least one communication interface at least one data point of the plurality of second fuel level data points for the plurality of second time periods;

receiving, by a second at least one communication interface of the remote device, the first fuel level data point and the at least one data point of the plurality of second fuel level data points;

determining, by a second at least one processor of the remote device, a fuel difference between the initial fuel level indicated in the first fuel level data point and a final fuel level indicated in a most recent data point of the at least one data point of the plurality of second fuel level data points;

determining whether the fuel difference is within a fuel difference threshold, the fuel difference threshold indicative of an acceptable discrepancy between initial fuel level and final fuel level;

if the fuel difference is within the fuel difference threshold, output, by a user interface, an indication that fuel adjustment is not needed; and if the difference exceeds the difference threshold, output, by the user interface, an indication that fuel adjustment is needed.

16. The method of claim 15, wherein:

the operation data comprises movement speed data representing a movement speed of the vehicle; and the stability criteria comprise a threshold in the movement speed of the vehicle, where the operation data is within the stability criteria when the movement speed of the vehicle is within the threshold, and the operation data is outside of the stability criteria when the movement speed of the vehicle exceeds the threshold.

17. The method of claim 15, wherein:

the operation data comprises vehicle engine data representing a rotation speed of an engine of the vehicle; and the stability criteria comprises a threshold in the rotation speed of the engine of the vehicle, where the operation data is within the stability criteria when the rotation speed of the engine of the vehicle is within the threshold, and the operation data is outside of the stability criteria when the rotation speed of the engine of the vehicle exceeds the threshold.

18. The method of claim 15, wherein:

the operation data comprises acceleration data representing acceleration of the vehicle; and the stability criteria comprises a threshold magnitude of the acceleration of the vehicle, where the operation data is within the stability criteria when the acceleration of the vehicle is within the threshold, and the operation data is outside of the stability criteria when the acceleration of the vehicle exceeds the threshold.

19. The method of claim 15, further comprising generating, by the first at least one processor, a simplified fuel level dataset for the plurality of second time periods by selectively filtering the plurality of second fuel level data points for the plurality of second time periods; wherein transmitting at least one data point of the plurality of second fuel level data points for the plurality of second time periods comprises transmitting the simplified fuel level dataset for the plurality of second time periods.

20. The method of claim 19, wherein generating the simplified fuel level dataset for the plurality of second time periods by selectively filtering the plurality of second fuel level data points for the plurality of second time periods comprises:

identifying select data points from the plurality of second fuel level data points for inclusion in the simplified fuel level dataset, based on differences between the select data points and iteratively-defined reference lines through portions of the fuel level trend; and compiling the select data points as the simplified fuel level dataset, excluding data points which are not identified as select data points.

* * * * *